(12) United States Patent
Yamazaki

(10) Patent No.: US 8,553,283 B2
(45) Date of Patent: Oct. 8, 2013

(54) PRINTING APPARATUS, PRINTING APPARATUS CONTROL METHOD, AND STORAGE MEDIUM ALLOWING EDITING TO AN IMAGE FORMED IN A REGION TO BE CUT OFF DURING POSTPROCESSING

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/966,568

(22) Filed: Dec. 13, 2010

(65) Prior Publication Data

US 2011/0149315 A1  Jun. 23, 2011

(30) Foreign Application Priority Data

Dec. 22, 2009 (JP) ................................ 2009-290251

(51) Int. Cl.
  *G06F 15/00* (2006.01)
  *G06K 1/00* (2006.01)
  *H04N 1/60* (2006.01)
  *G06F 3/12* (2006.01)

(52) U.S. Cl.
  USPC .......................................... 358/1.9; 358/1.13

(58) Field of Classification Search
  None
  See application file for complete search history.

(56) References Cited

U.S. PATENT DOCUMENTS 5,566,004 A * 10/1996 Imaizumi et al. ............. 358/450
7,942,593 B2 * 5/2011 Yamaguchi et al. ............ 400/76
2008/0024807 A1 1/2008 Matsuda

FOREIGN PATENT DOCUMENTS

| CN | 1573641 A | 2/2005 |
| JP | 5-050572 A | 3/1993 |
| JP | 2008-030331 A | 2/2008 |

* cited by examiner

*Primary Examiner* — Douglas Tran
(74) *Attorney, Agent, or Firm* — Canon USA Inc IP Division

(57) ABSTRACT

A control method for controlling a printing apparatus configured to print image data and capable of conveying a printed sheet to a postprocessing apparatus configured to trim the printed sheet identifies and manages a region to be cut off by trimming and another region not to be cut off by the trimming and allows a user to easily edit an image included in the region to be cut off by the trimming. The control method includes displaying the image data, editing the displayed image data, obtaining information about a trimming position at which the postprocessing apparatus trims the sheet, and executing control for permitting editing of a first region, which is a region to be cut off by the postprocessing apparatus according to the obtained information and for restricting editing of a second region not to be cut off by trimming by the postprocessing apparatus.

7 Claims, 20 Drawing Sheets

FIG.6A

USER BOX/003:ORE

| SELECT | DOCUMENT NAME | PAPER SIZE | PAGE | DATE AND TIME |
|---|---|---|---|---|
| ☑ | KINKYUTUTATU.pdf | A4 | 20 | 21:00, APRIL 1 |
| ☐ | USSO.pdf | A4 | 1 | 07:00, APRIL 2 |

- SELECT ALL
- BT10 DETAILED INFORMATION >
- DELETE
- PRINT LIST
- BT9 — PREVIEW AND EDIT IMAGE
- COMBINE AND STORE DOCUMENT DATA
- EDITING MENU
- CLOSE
- BT11 — DELETE PAGE

FIG.6B

PRINT

AUTO COLOR SELECT

READY TO COPY.

1

- BT12 ☐ CHANGE PRINT SETTING
- BT14 ☐ DELETE DOCUMENT DATA AFTER PRINTING
- BT15 CANCEL
- BT13 START PRINTING

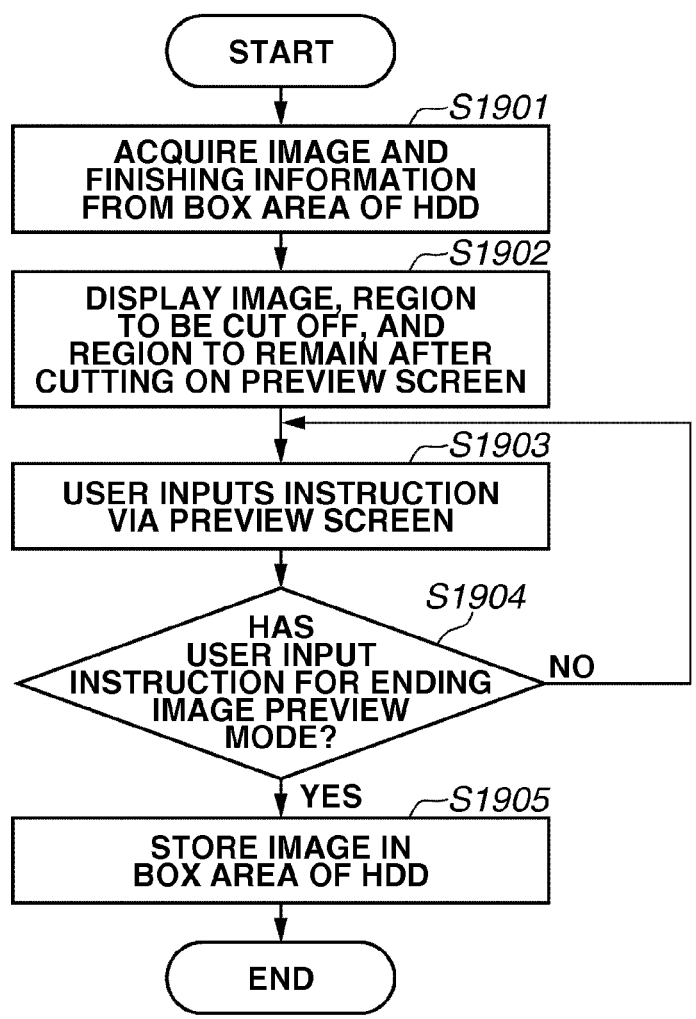

PRINTING APPARATUS, PRINTING APPARATUS CONTROL METHOD, AND STORAGE MEDIUM ALLOWING EDITING TO AN IMAGE FORMED IN A REGION TO BE CUT OFF DURING POSTPROCESSING

BACKGROUND OF THE INVENTION

1. Field of the Invention

The present invention relates to a printing apparatus, a printing apparatus control method, and a storage medium.

2. Description of the Related Art

A conventional printing system can execute not only stapling and punching but also case binding, which includes a combination of gluing, binding a sheet bundle with a cover, and cutting, by using a sheet postprocessing apparatus, such as an inline finisher, which is connected to a printing apparatus. The printing system is intended for the print on demand (POD) market.

On the other hand, an offline finisher has been widely used, which is not connected to a printing apparatus but executes postprocessing on a printed sheet, such as case binding. In conventional binding processing, by which a sheet bundle (print products) is bound after being trimmed by using the offline finisher described above, in a region of the sheet beyond the finishing size of the sheet, outside printed product (sheet) being trimmed into the finishing size, (i.e., the region to be cut off from the sheet) the following printed image may be formed as desired by a user.

In other words, a register mark, a simple color chart, and a crop mark may be formed in the region to be cut off from the printed sheet, to verify whether the sheet having multicolor images has not been misregistered, to verify the tint, or to indicate a cutting line and a folding line used in postprocessing (offline finishing). Furthermore, an image having a size slightly larger than the size of the image after trimming (i.e., an image of an extra size (including a bleed) is formed on the sheet extendedly in the peripheral supplementary region of the sheet between inner and outer register marks) to compose an image of a photograph on the entire sheet after trimming.

In addition, as described above, document data including an image having a size larger than the finishing size may be input as various information used for managing postprocessing (offline finishing processing) and for instructing an operation or as an document image to be output and postprocessed by offline finishing. However, a printing apparatus having an inline finisher, which is connected to the printing apparatus and to which a printed sheet can be directly conveyed, is capable of conveying a printed sheet directly to the inline finisher to trim the print product and bind the trimmed print product. Therefore, if a printing apparatus like this is used, it is basically not necessary to form an image having a size larger than the finishing size (i.e., an image having a size large enough to be formed in a region to be cut off from the sheet). In addition, because information for managing processing may include private information or confidential information, it is necessary to very carefully handle a trimming fragment.

Japanese Patent Application Laid-Open No. 2008-30331 discusses a method for reducing the consumption of a toner and an ink by automatically deleting images formed in the region to be cut off by trimming. However, if a printing apparatus to which an inline finisher is connected is used, not all the images formed in the region to be cut off from the sheet may be unnecessary. Accordingly, it is more useful if such images can be selectively deleted or edited. More specifically, if it is necessary to visually check the change in the tint by looking at a resulting product output on a sheet, and if color charts of all pages, each having a minimum area, are left after trimming, the user can verify the color charts of the trimming fragment later.

On the other hand, in an entered document, an image may be added in the region to be cut off and printed. In addition, in printing a form generated by using variable data, each page thereof corresponding to one matter, if the user is allowed to verify the form number or the page number of the printed form by looking at the trimming fragment after printing form, then the user can surely verify whether all the pages of the input form data have been completely printed.

As described above, it is desired by the market that in printing an entered document, which is to be postprocessed by offline finishing including trimming, the user is allowed to edit an image formed in a region to be cut off during postprocessing.

SUMMARY OF THE INVENTION

According to an aspect of the present invention, a printing apparatus configured to print image data and capable of conveying a sheet having a printed image thereon to a postprocessing apparatus configured to trim the printed sheet includes a display unit configured to display the image data, an editing unit configured to edit the image data displayed by the display unit, an obtaining unit configured to obtain information about a trimming position at which the postprocessing apparatus trims the sheet, and a control unit configured to permit editing by the editing unit of a first region, which is a region to be cut off by the postprocessing apparatus according to the information obtained by the obtaining unit and configured to restrict editing by the editing unit of a second region not to be cut off by trimming by the postprocessing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 6A and 6B illustrate an example of a UI displayed on the touch panel unit.

FIG. 18 is a flow chart illustrating an exemplary flow of control processing executed by the printing system.

DESCRIPTION OF THE EMBODIMENTS

Various exemplary embodiments, features, and aspects of the invention will be described in detail below with reference to the drawings.

Figure 1:
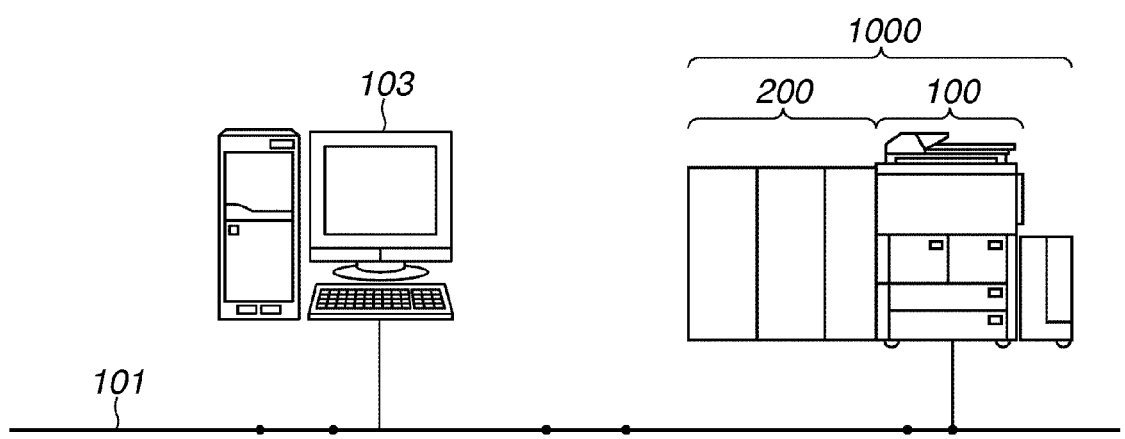
FIG. 1 illustrates an exemplary configuration of a printing system.

FIG. 1 is a block diagram illustrating an exemplary configuration of a printing system according to a first exemplary embodiment of the present invention. In the present exemplary embodiment, a multifunction peripheral (MFP) is used as a printing apparatus included in the printing system. More specifically, in the printing system according to the present exemplary embodiment, various types of postprocessing units, which execute various types of sheet postprocessing including trimming processing on a sheet, are serially connected to the MFP in tandem.

In addition, the printing system illustrated in FIG. 1 can communicate with an information processing apparatus (personal computer (PC)) 103 via the network 101. Furthermore, for easier understanding, the printing system illustrated in FIG. 1 includes one printing apparatus and one information processing apparatus. However, the number of the printing apparatus and the information processing apparatus is not limited to one.

Referring to FIG. 1, a printing system 1000 includes components, such as a printing apparatus 100 and a sheet processing apparatus 200. In the present exemplary embodiment, an MFP having a plurality of functions, such as a copy function and a print function is used as an example of the printing apparatus 100. However, a single-function printing apparatus having only a print function or a copy function can be used as the printing apparatus 100.

A sheet printed by the printing apparatus 100 can be conveyed directly from the printing apparatus 100 to the sheet processing apparatus 200. More specifically, a sheet conveyance path of the printing apparatus 100 can be connected to a sheet conveyance path of the sheet processing apparatus 200. As described above, the sheet processing apparatus 200 and the printing apparatus 100 of the printing system 1000 are physically connected with each other.

In addition, each of the printing apparatus 100 and the sheet processing apparatus 200 has a central processing unit (CPU). Accordingly, the printing apparatus 100 and the sheet processing apparatus 200 can execute data communication therebetween by using the CPUs. In other words, the printing apparatus 100 and the sheet processing apparatus 200 of the printing system 1000 are electrically connected with each other.

In the present exemplary embodiment, the printing system 1000 includes a control unit, which controls the entire operation of each of the printing apparatus 100 and the sheet processing apparatus 200. In other words, a control unit 205 (FIG. 2) included in the printing apparatus 100, which is an example of the control unit, controls the entire operation of the printing apparatus 100 and the sheet processing apparatus 200. Furthermore, in the present exemplary embodiment, a sheet processing apparatus connected to the printing apparatus and capable of automatically and completely postprocess a printed sheet is referred to as an "inline finisher". Moreover, the printing apparatus 100 is connected with the external PC 103 via a network 101. The external PC 103 transmits (inputs) print job data to the printing system 1000 via a printer driver.

Figure 2:
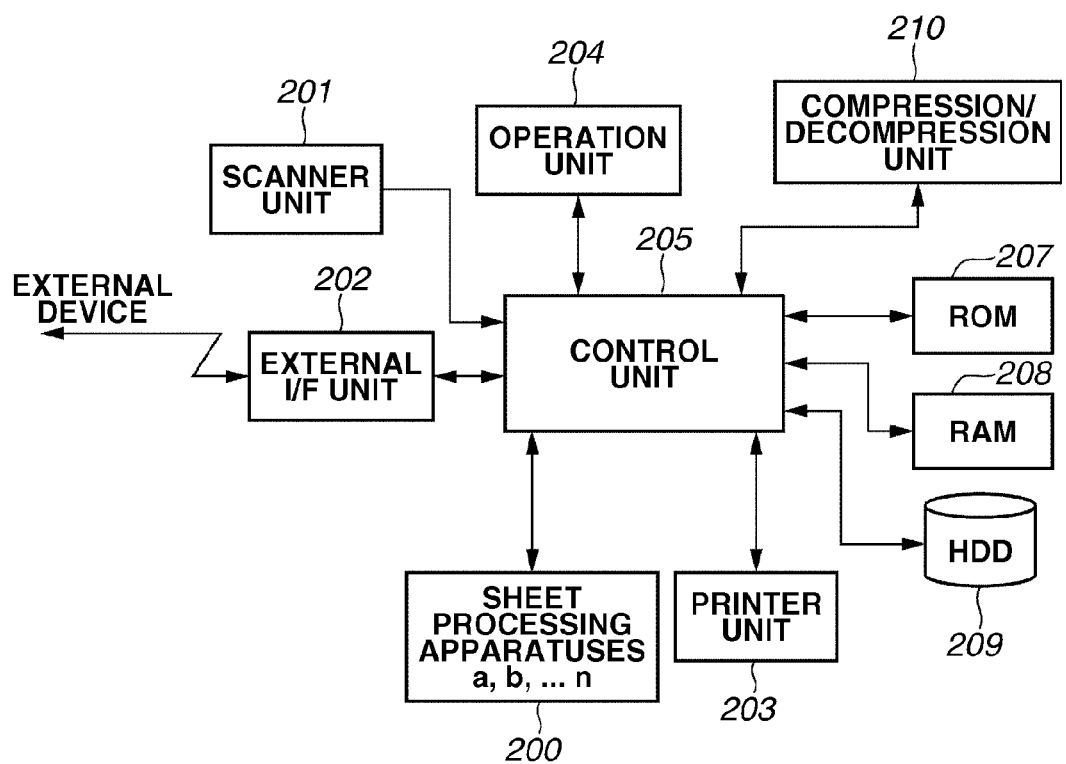
FIG. 2 is a block diagram illustrating an exemplary configuration of a printing system.

An exemplary inner configuration of the printing system 1000 will now be described in detail below with reference to FIG. 2. FIG. 2 is a block diagram illustrating an exemplary configuration of the printing system 1000 illustrated in FIG. 1. In the present exemplary embodiment, all units included in the printing system 1000 illustrated in FIG. 2 except the sheet processing apparatus 200 is included in the printing apparatus 100.

In the present exemplary embodiment, strictly describing, the sheet processing apparatus 200 is a group of sheet processing apparatuses serially connected with one another, which can include a plurality of inline type sheet processing apparatuses. To paraphrase this, the sheet processing apparatus 200 is a sheet processing apparatus detachably connected to the printing apparatus 100. In other words, the sheet processing apparatus 200 can be optionally connected and provided to the printing apparatus 100. Accordingly, the present exemplary embodiment can provide necessary number of necessary inline finishers. In this order, the present exemplary embodiment has the following configuration.

The printing apparatus 100 includes, as a component of the printing apparatus itself, a non-volatile memory such as a hard disk 209 (hereinafter simply referred to as an "HDD"), which can store data of a plurality of jobs to be processed. In addition, the printing apparatus 100 includes a copy function for printing the job data received from a scanner unit 201, which is included in the printing apparatus 100, by using the printer unit 203 via the HDD 209.

In addition, the printing apparatus 100 includes a print function for printing the job data received from an external apparatus such as the PC 103 via an external interface (I/F) unit 202 by using the printer unit 203 via the HDD 209. The printing apparatus 100 according to the present exemplary embodiment is an MFP type printing apparatus (image forming apparatus) having a plurality of functions described above.

For the printing apparatus according to the present exemplary embodiment, any printing apparatus having a configuration that enables execution of various types of control operations to be described in the following present exemplary embodiment can be used regardless of whether the printing apparatus is capable of executing color printing or monochromatic printing.

The printing apparatus 100 according to the present exemplary embodiment includes a scanner unit 201, which reads an image of a document and performs image processing of the read image data. The external I/F unit 202 transmits and receives data to and from a facsimile transmission apparatus, a network-connected apparatus, and an external dedicated apparatus via a public line, the network 101, or other communication methods.

The hard disk 209 can store image data of the plurality of jobs to be printed received from either of the scanner unit 201 and the external I/F unit 202. The printer unit 203 executes printing of the data of the job to be printed, which has been stored on the HDD 209, on a printing medium.

The printing apparatus 100 also includes an operation unit 204. The operation unit 204 includes a display unit, which is an example of a UI unit included in the printing system 1000. In the present exemplary embodiment, as another example of the UI unit provided by the printing system 1000, a display unit, a keyboard, and a mouse of the PC 103 and the external apparatus are used. The control unit (hereinafter will be also referred to as a "CPU") 205, which is an example of the control unit of the printing system 1000, controls the entire processing and the print control executed by various units included in the printing system 1000.

A read-only memory (ROM) 207 stores various control programs necessary for the present exemplary embodiment. More specifically, the control program stored on the ROM 207 includes a program of processing illustrated in each of the following flow charts and a program for executing various types of processing for displaying information on a UI screen. In addition, the ROM 207 stores a display control program for displaying various UI screens including those illustrated in the following corresponding drawings on a display unit of the operation unit 204.

The control unit 205 loads and executes the program from the ROM 207 to implement various operations by the printing apparatus according to the present exemplary embodiment. In addition, the ROM 207 stores a program for interpreting page description language (PDL) code data received from the external apparatus (i.e., the PC 103) via the external I/F unit 202 and for rasterizing the data into raster image data (bitmap image data). More specifically, the rasterization of the PDL code data into raster image data (bitmap image data) is executed by software. Furthermore, the ROM 207, which is a read-only memory, previously stores various programs, such as a boot sequence, font information, and the above-described program.

A random access memory (RAM) 208 stores image data transmitted from the scanner unit 201 and the external I/F unit 202 via a memory controller. In addition, the RAM 208 stores various programs and various setting information loaded from the ROM 207. The HDD 209 is a mass storage device that stores image data compressed by a compression/decompression unit 210. More specifically, the HDD 209 can store a plurality of pieces of data, such as print data of jobs to be processed.

The control unit 205 executes control for printing the data of the job to be processed input via various input units, such as the scanner unit 201 and the external I/F unit 202, on the printer unit 203 via the HDD 209. In addition, the control unit 205 executes control for transmitting the input print job data to the external apparatus (the PC 103) via the external I/F unit 202. Furthermore, the control unit 205 executes control for outputting the data of the job to be processed, from the HDD 209 by various output processing.

The compression/decompression unit 210 executes compression/decompression operations on image data stored on the RAM 208 and the HDD 209 by using various compression methods, such as Joint Bi-level Image Experts Group (JBIG) or Joint Photographic Experts Group (JPEG). The control unit 205 determines whether a plurality of sheet processing apparatuses is physically and electrically connected to the printing apparatus. In other words, the control unit 205 executes the determination whether the sheet processing apparatus 200 is connected to the printing apparatus 100 in-line.

Figure 3:
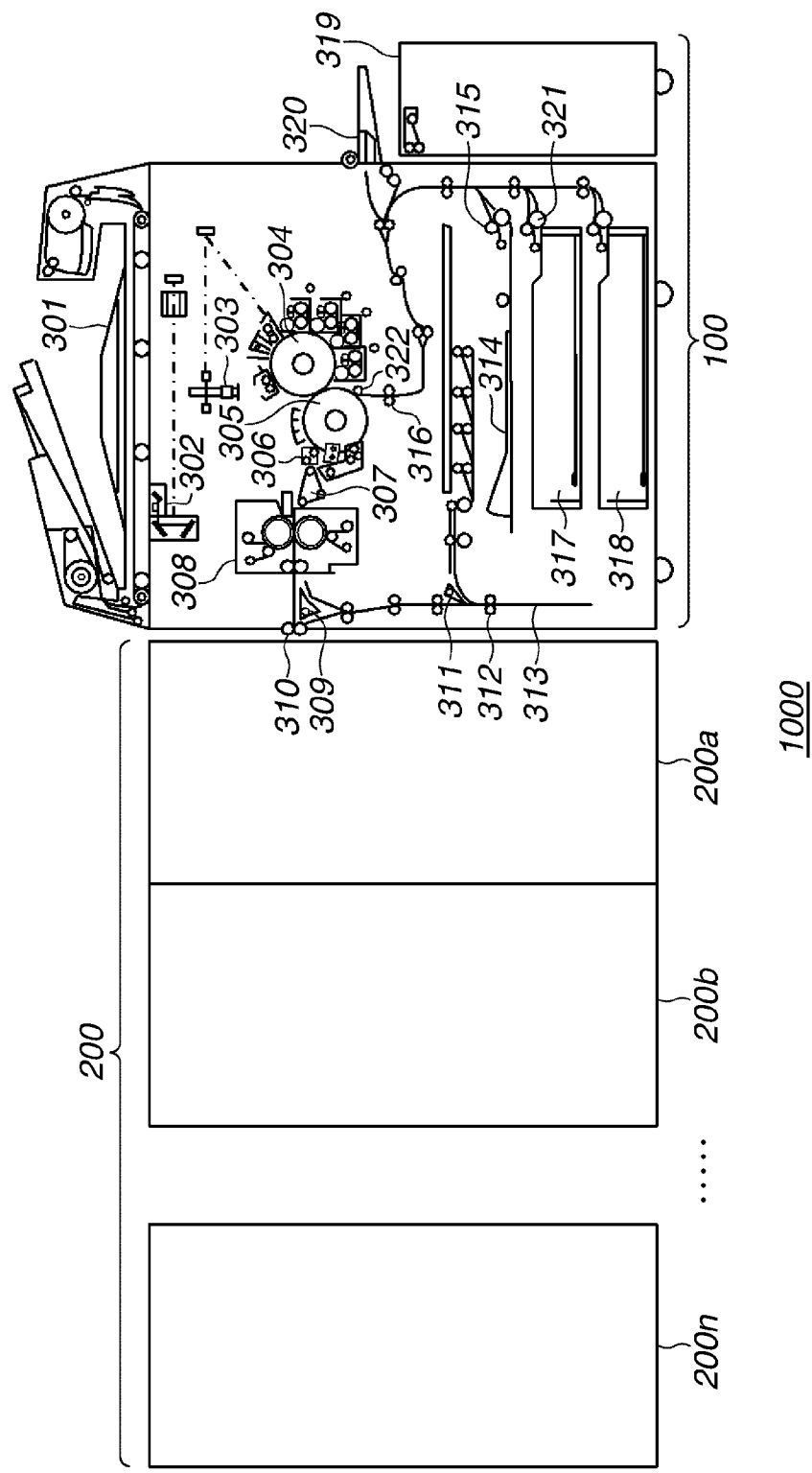
FIG. 3 is a cross section of an exemplary configuration of a printing apparatus included in the printing system.

Now, an exemplary configuration (primarily in terms of the mechanical aspect) of the printing system 1000 will be described in detail below with reference to FIG. 3. FIG. 3 is a cross section illustrating an exemplary configuration of the printing apparatus included in the printing system 1000 illustrated in FIG. 1.

As described above, in the printing system 1000, a plurality of sheet processing apparatuses can be serially connected to the printing apparatus 100 in cascades. An arbitrary number of inline type sheet processing apparatuses can be connected to the printing apparatus 100 according to the environment of use of the customer in order to implement and increase an effect of the present exemplary embodiment under a specific restriction. Accordingly, in the example illustrated in FIG. 3, N sheet processing apparatuses 200 can be connected to the printing apparatus 100 as a group of sheet processing apparatuses serially connected in-line to the printing apparatus 100, for easier understanding. More specifically, sheet processing apparatuses 200a, 200b, and the like are connected to the printing apparatus 100 starting from the sheet processing apparatus 200a in order of closeness of physical connection to the printing apparatus 100. A sheet processing apparatus 200n indicates an N-th sheet processing apparatus 200.

Figure 8:
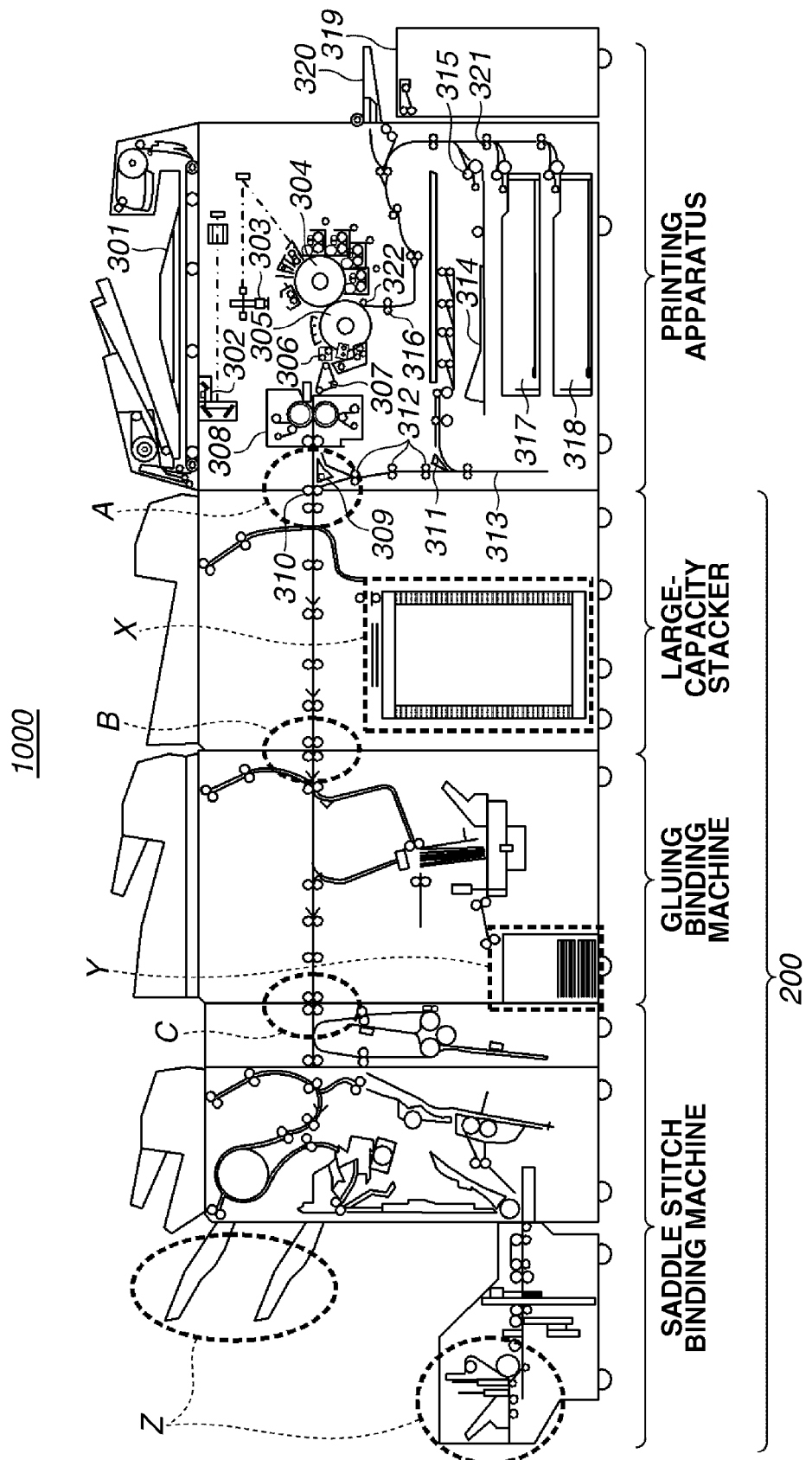
FIG. 8 illustrates an exemplary configuration of a sheet postprocessing unit.

In the example illustrated in FIG. 8, the sheet processing apparatuses that can be connected to the printing apparatus 100 in-line, such as a large-capacity stacker 200a, a gluing binding machine 200b, and a saddle stitch binding machine 200c, are connected to the printing apparatus 100.

An exemplary mechanical configuration of the printing apparatus 100, which executes print processing, will be described in detail below. In the following description, a paper handling operation including feeding of a printed sheet from the printer unit 203 to the sheet processing apparatus 200 will be primarily described.

Referring to FIG. 3, the scanner unit 201 (FIG. 2) includes a component 301 as its mechanical configuration. The printer unit 203 (FIG. 2) includes components 302 through 322 as its mechanical configuration.

In the present exemplary embodiment, a configuration of a 1-drum (D) type color MFP will be described. However, the present exemplary embodiment is not limited to this. More specifically, a 4-D type color MFP and a monochromatic MFP can be used as an example of the printing apparatus according to the present exemplary embodiment. However, a detailed description thereof is omitted.

Referring to FIG. 3, an auto document feeder (ADF) 301 separates a top document sheet of a document sheet bundle set on a stacking surface of a document tray in order of pages and conveys the separated document onto a document positioning glass to scan the document with a scanner 302. The scanner 302 reads an image on the document conveyed onto the document positioning glass and converts the read image into image data with a charge-coupled device (CCD). A ray, such as a laser beam, modulated according to image data is incident on a rotating polygonal mirror 303. The ray reflected from the polygon mirror 303 falls on the surface of a photosensitive drum 304 via a reflection mirror as reflection scanning light.

A latent image formed on the surface of the photosensitive drum 304 with the laser beam is developed with a toner. A toner image is transferred onto a sheet attached onto the surface of a transfer drum 305. By serially performing a series of image forming processing on toners of colors of yellow (Y), magenta (M), cyan (C), and black (K), a full color image is formed. After performing the image forming processing four times, a sheet on the transfer drum 305, onto which a full color image has been formed, is separated by a separation claw 306. The separated sheet is conveyed to a fixing device 308 by a pre-fixing conveyance device 307.

The fixing device 308 includes rollers and a belt in combination with one another. The fixing device 308 includes therein a heat source, such as a halogen heater, and fuses and fixes the toner on the sheet, onto which the toner image has been transferred, with heat and pressure. A paper discharge flapper 309 can swing around a swinging axis and regulates the direction of conveying a sheet.

When the paper discharge flapper 309 swings clockwise in FIG. 3, the sheet is conveyed in a straight direction and then is discharged to the outside of the image forming apparatus 100 by a paper discharge roller 310. By executing a series of processing described above, the control unit 205 controls the image forming apparatus 100 so that the image forming apparatus 100 performs one-sided printing.

On the other hand, in forming images on both sides of the sheet, the paper discharge flapper 309 swings counterclockwise in FIG. 3. The conveyance direction of the sheet is changed to the downward direction to convey the sheet to a two-sided conveyance unit. The two-sided conveyance unit includes a reverse flapper 311, a reverse roller 312, a reverse guide 313, and a two-sided tray 314.

The reverse flapper 311 swings around a swinging axis and regulates the direction of conveying a sheet. In performing a two-sided print job, the control unit 205 performs control so that the reverse flapper 311 swings counterclockwise in FIG. 3 to convey a sheet, whose first surface is already printed by using the printer unit 203, into the reverse guide 313 via the reverse roller 312. The control unit 205 temporarily stops the reverse roller 312 in the state where a trailing edge of the sheet is pinched by the reverse roller 312, and then allows the reverse flapper 311 to swing clockwise in FIG. 3. Further, the control unit 205 allows the reverse roller 312 to rotate in a reverse direction.

In the above-described manner, the sheet is conveyed by a switch-back operation. The control unit 205 performs control to guide the sheet to the two-sided tray 314 in the state where the leading edge and the trailing edge of the sheet have been changed in position. The sheet is temporarily stacked on the two-sided tray 314. The sheet is then conveyed to a registration roller 316 by a refeed roller 315.

At this time, the sheet is fed with a side opposite to the first surface used in the transfer processing, facing the photosensitive drum 304. Then, the control unit 205 performs control to form an image on the second surface of the sheet as in the processing described above. Thus, images are formed on both sides of the sheet. After fixing processing is completed, the sheet is discharged to the outside of the image forming apparatus 100 via the paper discharge roller 310.

By serially performing the two-sided printing processing described above, the control unit 205 controls the image forming apparatus 100 to perform two-sided printing on each of the first surface and the second surface of the sheet for printing the data of the job to be printed by two-sided printing.

The image forming apparatus 100 includes a paper feeding and conveyance unit for storing sheets used for print processing. The paper feed unit includes paper feed cassettes 317 and 318, each of which can store five hundred sheets, for example, a paper feed deck 319, which can store five thousand sheets, for example, and a manual feed tray 320. A paper feed roller 321 and a registration roller 316 are units for feeding the sheet stored in the above-described paper feeding and conveyance units.

Various sheets of different sizes and materials can be respectively set in the paper feed cassettes 317 and 318 and the paper feed deck 319. In the manual feed tray 320, various types of sheets (print media) including a special sheet, such as an overhead projector (OHP) sheet, can be set. Each of the paper feed cassettes 317 and 318, the paper feed deck 319, and the manual feed tray 320 includes a paper feed roller 321. Sheets can be serially fed by the paper feed roller 321 one by one.

Focusing on the paper feed/conveyance mechanism that the paper feed unit employs, the mechanism used when feeding a sheet from the paper feed cassettes 317 and 318 is different from the mechanism used when feeding a sheet from the manual feed tray 320. The difference between these cases will be described in detail below with reference to FIGS. 6A and 6B.

More specifically, stacked sheet materials are serially fed by a pickup roller. The sheet material is conveyed to a conveyance guide sheet by sheet while preventing double feeding by using a separation roller. The separation roller is provided so as to face the paper feed roller 321. Driving force for rotating the separation roller in the reverse direction of the sheet conveyance direction is input via a torque limiter (not illustrated).

If only one sheet material has entered a nip generated between the separation roller and the paper feed roller, the separation roller is rotated in the sheet conveyance direction driven by the rotational force of the paper feed roller that conveys the sheet material. On the other hand, if double feeding has occurred, the paper feed roller rotates in the reverse direction of the sheet conveyance direction to return the double-fed sheet material to its unfed position. In the above-described manner, the present exemplary embodiment can securely prevent double feeding and feed the sheet placed on top of the sheet stack only at one paper feeding operation.

The fed sheet material is then guided between the paper conveyance guides and is conveyed to the registration roller 316 by a plurality of conveyance rollers. At this timing, the registration roller 316 is in the non-rotated state. When the leading edge of the sheet material contacts the nip formed between the pair of registration rollers 316, the sheet material forms a loop. In this manner, an otherwise possible skewed sheet conveyance can be corrected.

Subsequently, the registration roller 316 starts rotation in synchronization of the transfer of toner images formed by the image formation unit on the photosensitive drum 304. Thus, the sheet material is further conveyed. The sheet material conveyed by the registration roller 316 is electrostatically attracted by an attraction roller 322 towards the surface of the transfer drum 305.

The sheet material that has been discharged from a fixing unit 308 is then introduced into the sheet conveyance path of the sheet processing apparatus 200 via the paper discharge roller 310.

The control unit 205 executes the above-described print processing to output and print the job to be printed.

In addition, the control unit 205 generates a print job according to a print execution request received from the user via the operation unit 204 and the external I/F unit 202. Furthermore, the control unit 205 executes control for causing the printer unit 203 to execute the processing for printing the print job by using the above-described method.

In executing the copy function of the printing apparatus 100, the control unit 205 executes the following control. More specifically, when a print request input by the user is received via the operation unit 204, the control unit 205 executes control for causing the scanner unit 201 to generate image data to create a print job. Furthermore, the control unit 205 executes control for storing the generated print job on the HDD 209 in order from a first page of the print data.

In executing the box print function of the printing apparatus, when the user has input a print execution request via the operation unit 204, the control unit 205 generates a print job based on document data and image data previously stored by a user operation in a box area of the HDD 209. Furthermore, the printing apparatus 100 can receive a job, which has been created based on a print execution request received by the host computer 103 and generated by the host computer 103, from the external I/F unit 202 via the network 101. In this case, the control unit 205 executes control for serially storing the print data of the received print job on the HDD 209 starting from the first page.

Subsequently, the control unit 205 serially reads the print data of the job from the HDD 209 starting from the first page. Furthermore, the control unit 205 executes necessary conversion into image data and forms an image of the print data on the sheet. In addition, the control unit 205 executes control for supplying the sheet to be printed starting from data of the first page of the input job into the sheet conveyance path of the sheet processing apparatus 200 with the surface of the sheet having the printed image facing downwards.

In order to execute the above-described control, the control unit 205 controls the paper discharge flapper 309 and the roller 312 to perform the switchback operation for turning the sheet conveyed from the fixing unit 308 upside down immediately before conveying the sheet into the sheet processing apparatus 200 by the paper discharge roller 310. The control unit 205 also executes the above-described paper handling control for processing the first page of input print data in the above-described manner.

Now, the operation unit 204 of the user interface unit (hereinafter simply referred to as a "UI unit") included in the printing apparatus 100 will be described in detail below with reference to FIGS. 4 through 6.

Figure 4:
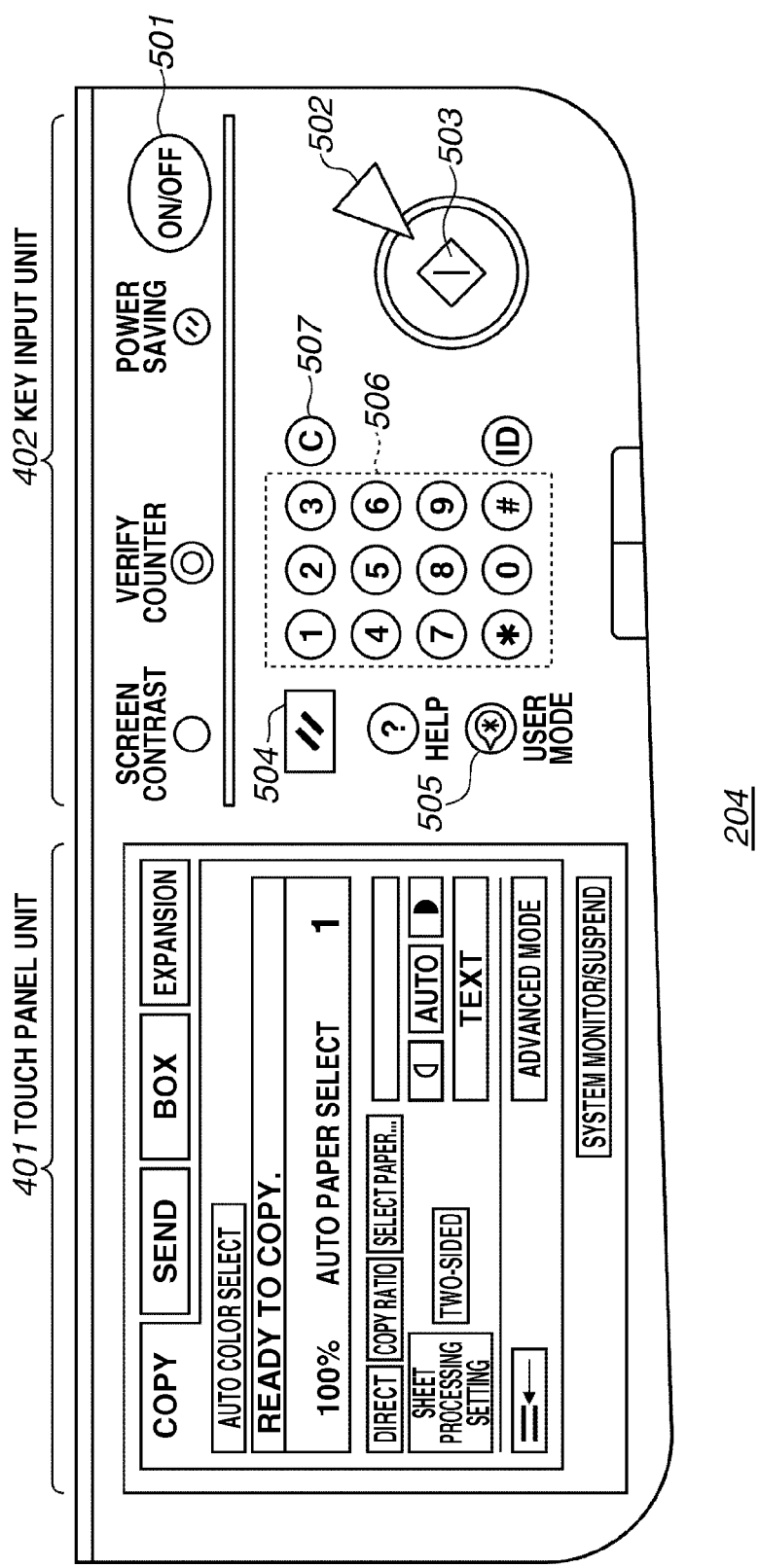
FIG. 4 illustrates an example of a user interface (UI) of the printing apparatus.

FIG. 4 illustrates an example of a UI of the printing apparatus 100 according to the present exemplary embodiment. Referring to FIG. 4, the operation unit 204 includes a key input unit 402 and a touch panel unit 401. The user can input an operation via the key input unit 402 by operating hard keys thereof. The touch panel unit 401 is an example of a display unit via which a user operation can be input by pressing soft keys (display keys).

The touch panel unit (display unit) 401 includes a liquid crystal display (LCD) and a transparent electrode attached on the LCD. The touch panel unit 401 includes a function for receiving various settings input by the operator (user) and a function for presenting information to the operator. When a position on the LCD corresponding to a currently enabled display key is pressed by the user, the control unit 205 executes control for displaying an operation screen corresponding to the key input on the touch panel unit 401 according to a display control program previously stored on the ROM 207.

The key input unit 402 includes an operation unit power switch 501. When the user operates the operation unit power switch 501 to supply power to the operation unit 204 of the printing apparatus 100, the control unit 205 selectively toggles between a standby mode (a normal operation mode) and a sleep mode of the printing apparatus 100. The sleep mode corresponds to a state in which the printing apparatus 100 saves power consumption by suspending the operation of programs waiting for an interruption by a network print job or a facsimile transmission/receiving job.

If a main power switch (not illustrated), which can be operated to supply power to the entire system, has been switched "ON", the control unit 205 executes control for receiving a user operation of the operation unit power switch 501.

A start key 503 can be operated by the user to input an instruction to the printing apparatus 100 for starting processing of a job of the type instructed by the user, such as the copying or the transmission of the job to be processed. A stop key 502 can be operated by the user to give an instruction to the printing apparatus 100 for suspending the processing of the received job.

The user can operate numeric keypad 506 to input a numerical value for various settings. Furthermore, the user can press a clear key 507 to cancel various parameters, such as a numerical value, once input by the user via the numeric keypad 506. A reset key 504 can be operated by the user to reset the setting value to a default value by nullifying various settings that have been set by the user to the job to be processed. The user can use a user mode key 505 to shift to a system setting screen, which is set to each user.

FIGS. 5A and 5B and FIGS. 6A and 6B illustrate an example of a UI displayed on the touch panel unit 401 illustrated in FIG. 4. The screen illustrated in each of FIGS. 5A and 5B and 6A and 6B is displayed on the touch panel unit 401 when the box function of the printing apparatus 100 can be currently used. In the present exemplary embodiment, a "box function" refers to a function that uses a plurality of data storage boxes (hereinafter simply referred to as a "box"), which is previously provided on the HDD 209 and can be used exclusively by each specific user. The control unit 205 allows the user to select a box via the UI unit. Furthermore, the control unit 205 allows the user to input a desired operation.

In response to an instruction input by the user via the operation unit 204, the control unit 205 executes control for storing document data of the job received by the printing apparatus 100 in a box of the HDD 209 selected by the user. In addition, the control unit 205 can store document data of a job from the external apparatus (the host computer 103) received via the external I/F unit 202 in the box designated by the user. In this case, it is useful if the control unit 205 stores the document data according to an instruction input by the user of the external apparatus, which is input via a UI unit of the external apparatus.

Furthermore, the control unit 205 executes the following processing on the data of the job stored in the box according to the user instruction input via the operation unit 204. More specifically, the control unit 205 prints the data of the job by using the printer unit 203 or transmits the data of the job to the external apparatus via the external I/F unit 202.

The document data to be stored in the box has a format of an image data converted into a PE image by using a PDL module. When the user inputs an instruction for storing the portable document format (PDF) document in the box, the document data is converted into an image (into image signals) by using the PDL module.

Figure 5A:
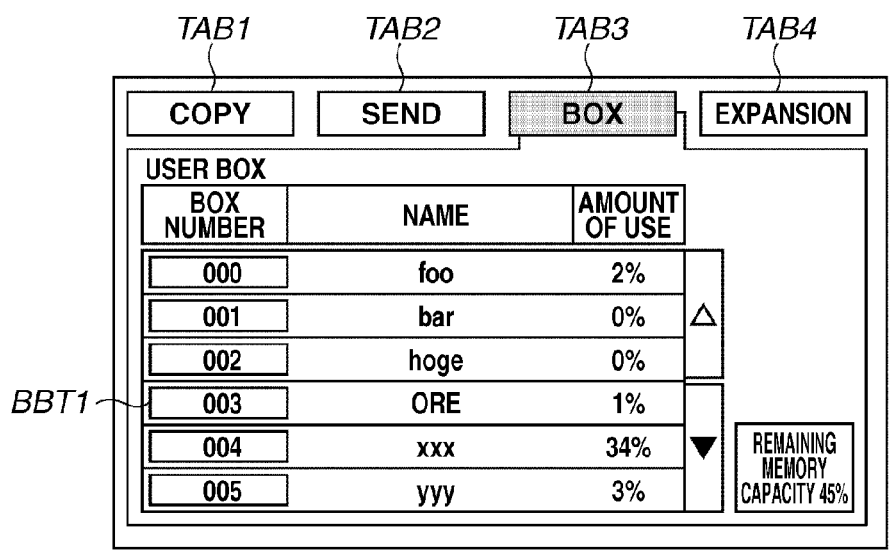
FIGS. 5A and 5B illustrate an example of a UI displayed on a touch panel unit.

FIG. 5A illustrates an example of a box function initial screen, which is displayed on the touch panel unit 401 under control of the control unit 205 when a tab TAB 3 for the box function is pressed by the user. When the user selects and presses various functional tabs displayed on the initial screen in its upper portion, the screen shifts to a screen corresponding to a function other than the box function.

More specifically, if a tab TAB 1 for the copy function is pressed by the user, the control unit 205 executes control for displaying an operation screen for the copy function, which is included in the printing apparatus 100, on the touch panel unit 401. In addition, if a tab TAB 2 for the transmission function is pressed by the user, the control unit 205 executes control for displaying an operation screen for a data transmission (send) function for transmitting data via facsimile or e-mail, which is included in the printing apparatus 100, on the touch panel unit

401. Furthermore, if a tab TAB 4 for expansion function is pressed by the user, the control unit 205 executes control for displaying a screen for setting an expansion function including a scanner setting function, which is included in the printing apparatus 100, on the touch panel unit 401.

In the following description, a content to be displayed on the touch panel unit 401 will be described in detail below with reference to FIGS. 5A, 5B, 6A, and 6B. In addition, an operation executed by the control unit 205 when the button displayed on the touch panel unit 401 is pressed by the user according to the display control program previously stored on the ROM 207 of the printing apparatus 100 will be described in detail below with reference to the following flow charts.

On the initial screen for the box function illustrated in FIG. 5A, a box number assigned to each user, a name of each box, and an amount of use of data storage area on the HDD 209 of each box are displayed. The user can select a box and verify information about the box. In a lower-right portion of the screen, the remaining memory capacity is displayed.

Figure 5B:
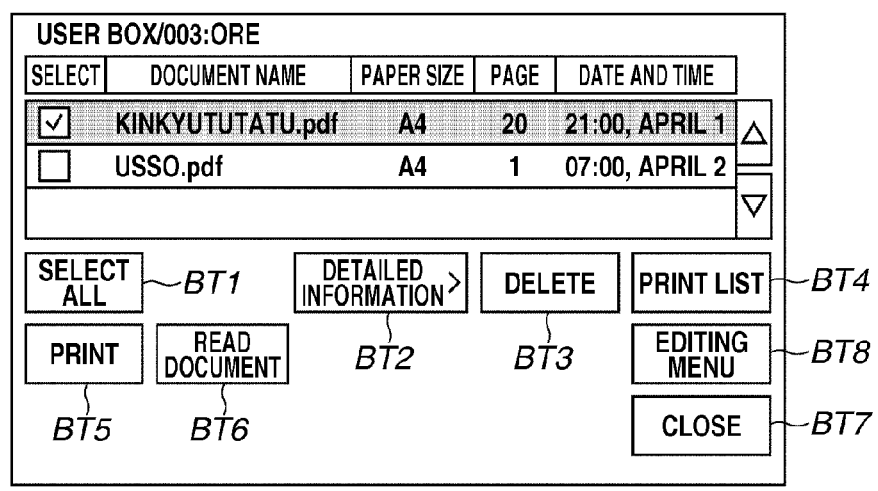

FIG. 5B illustrates an example of a user box operation screen. The user box operation screen is displayed on the touch panel unit 401 under control of the control unit 205 when the user has pressed a button BT 1, which corresponds to a box number "003" illustrated in FIG. 5A.

The document data stored in the box number 003 is displayed on the screen as a list. Furthermore, information about each document data, such as a document name (a file name assigned to the document data before being converted into an image), a sheet size, the number of pages, and information about the date and time of storing the document data into box, is displayed on the box. The user can verify each information by referring to the screen illustrated in FIG. 5A.

In the example illustrated in FIG. 5B, a check box corresponding to each document data is displayed to the left of the document data name field. The check box displays selection status information as a toggle check box. When the user presses the check box once, one or more documents are selected as document(s) to be subjected to various document processing. In the example illustrated in FIG. 5B, a document "kinkyututatu".pdf has been selected.

When the user presses a "select all" button BT 1, all the document data in the box number 003 is selected. In addition, when the user presses a "detailed information" button BT 2, various setting information about the selected document data is displayed on another screen. When the user presses a "delete" button BT 3, the selected document data is deleted from the HDD 209.

When the user presses a "print list" button BT 4, a job for printing a list of the document data in the box number 003 is generated. When the user presses a "print" button BT 5, the control unit 205 controls the display screen to shift to a display screen illustrated in FIG. 6B.

When the user presses a "read document" button BT 6, the scanner unit 201 generates image data. The generated image data is stored as new box document data. The stored document is immediately added to the list of document data and displayed in the list. When the user presses a "close" button BT 7, the screen shifts to the initial screen for the box function illustrated in FIG. 5A.

Figure 17:
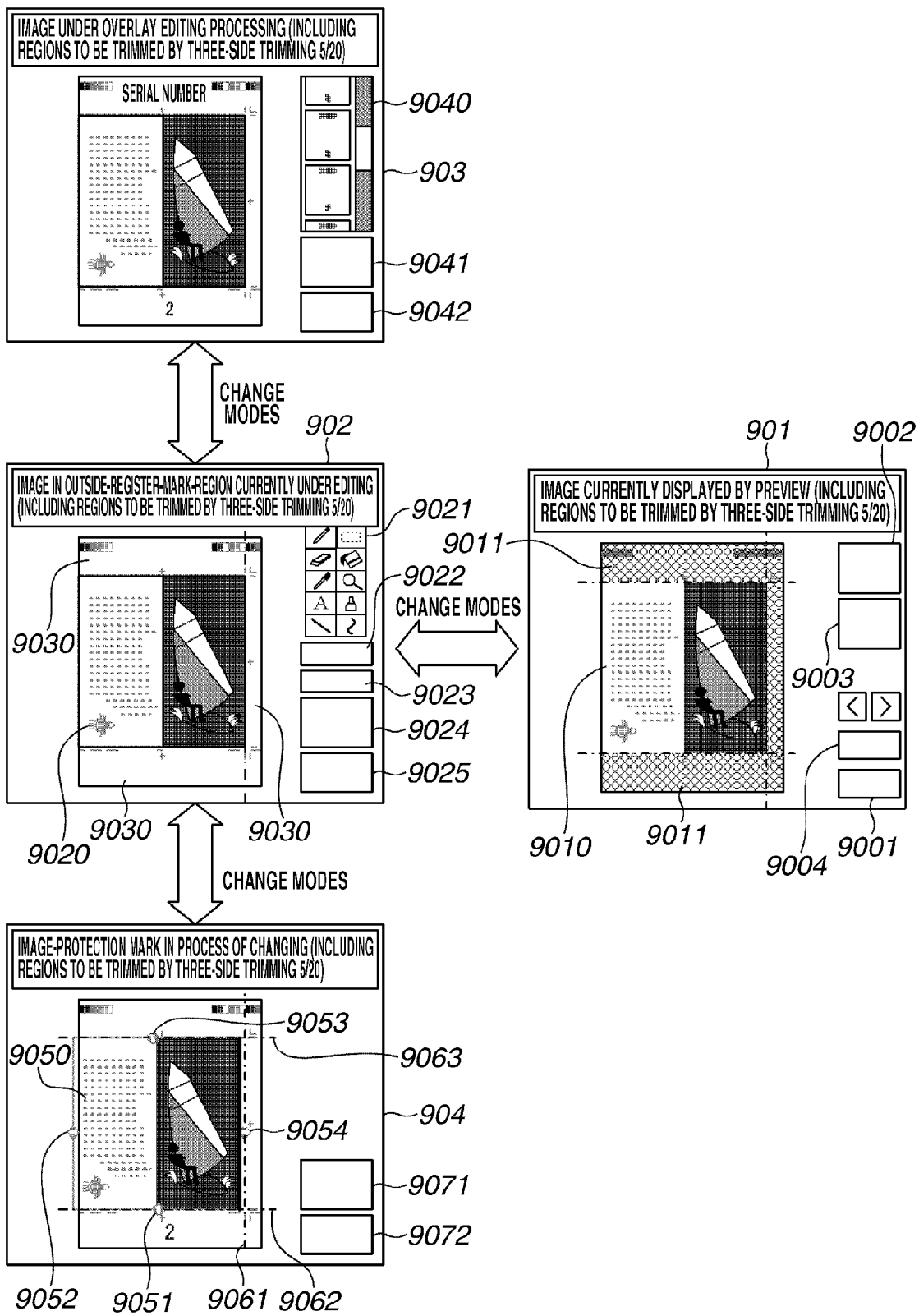
FIG. 17 illustrates an example of a UI displayed on the touch panel unit.

When the user presses an "editing menu" button BT 8, another screen for editing the document data is displayed to allow the user to change the setting of the selected document data and preview and edit the image of the document data. The screen displayed on the touch panel unit 401 in this case will be described with reference to FIG. 6A. When the user presses a "preview and edit image" button BT 9, an image preview and edit mode screen illustrated in FIG. 17 is displayed. The image preview and edit mode screen will be described in detail below.

A "combine and store document data" button BT 10 can be pressed only when a plurality of pieces of document data is selected. When the user presses a "combine and store document data" button BT 10, the plurality of selected pieces of document data is merged. Furthermore, the merged document data is stored on the HDD 209 as new one piece of document data. In this case, the selected document data before being merged is deleted. When the user presses a "delete page" button BT 11, a deletion target page selection screen for selecting a specific page to be deleted, of the selected document data, is displayed.

FIG. 6B illustrates an example of the screen displayed when the user presses a "print" button BT5 illustrated in FIG. 5B. Via the screen illustrated in FIG. 6B, the user can input an instruction for generating a print job based on the document data selected via the screen illustrated in FIG. 5B displayed previously. When the user presses a "change print setting" button BT 12, a print setting screen is displayed. Via the print setting screen, the user can execute and change various print settings necessary for generating a print job. Although the print setting screen is not illustrated in the drawing, the user can input and change a value of the paper size, the paper type, the print method (one-sided printing or two-sided printing), and the density. The user can shift the screen from the print setting screen to a sheet processing setting screen illustrated in FIG. 7. The sheet processing setting screen will be described in detail below with reference to FIG. 7.

In addition, the user can input an arbitrary numerical value via the numeric keypad 506 to change the number of prints. When the user presses a "start printing" button BT 13, a print job is generated based on the selected document data.

A "delete document data after printing" button BT 14 is a toggle button that can be toggled ON and OFF by the user. The selected box document is automatically deleted from the HDD 209 after the print job is generated only when the button BT is ON. When the user presses a "cancel" button BT 15, the display returns to the screen illustrated in FIG. 5A.

Figure 7:
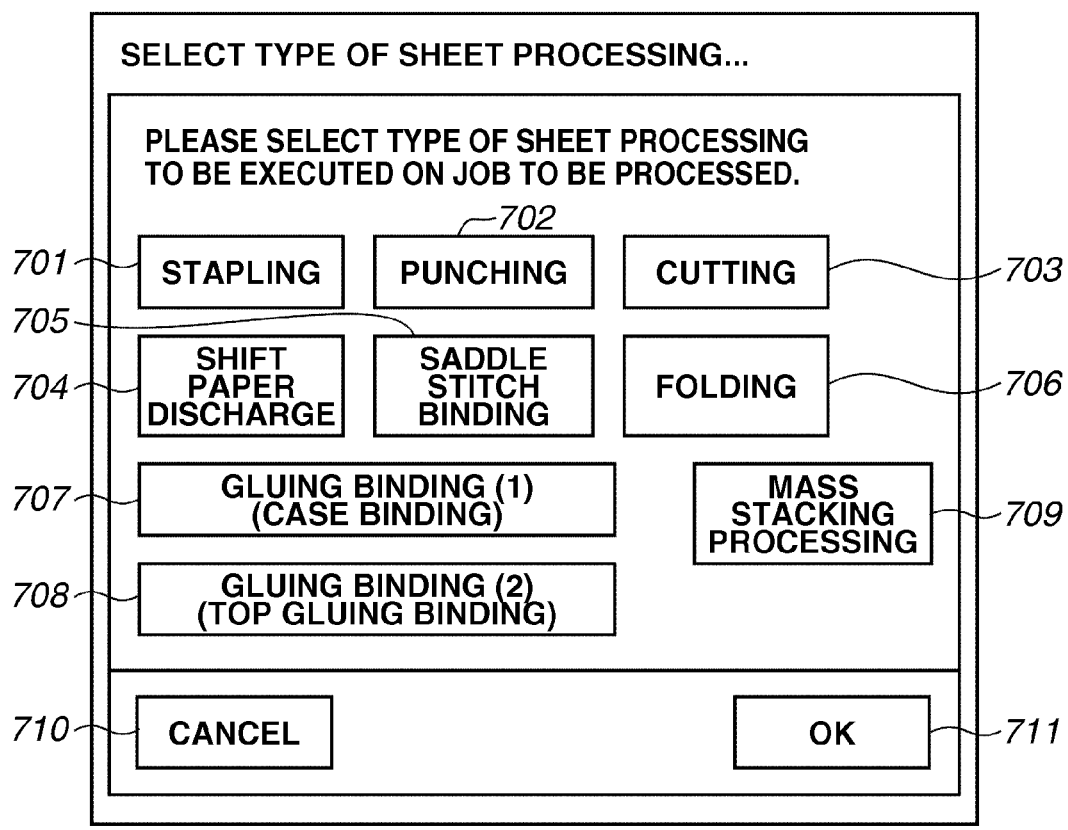
FIG. 7 illustrates an example of a UI displayed on the touch panel unit.

FIG. 7 illustrates an example of a user interface displayed on the touch panel unit 401 illustrated in FIG. 4. In the following description, a content displayed on the touch panel unit 401 when the user presses the "change print setting" button BT 12 via the screen illustrated in FIG. 6B and when the user selects a button for shifting to the sheet processing setting screen will be described in detail. In addition, an operation executed by the control unit 205 according to the display control program previously stored on the ROM 207 of the printing apparatus 100 when the user presses the button displayed on the touch panel unit 401 will be described in detail below.

Each button displayed on the screen illustrated in FIG. 7 can also function as a button for receiving, during job setting processing, a request for executing sheet processing by the sheet processing unit of the inline type sheet processing apparatus 200.

At first, the control unit 205 determines a candidate of the sheet processing that can be selected according to the type of sheet processing apparatus included in the printing system 1000. More specifically, the printing system 1000 permits the sheet processing illustrated in FIG. 7 to be executed on the sheet printed by the printer unit 203.

As illustrated in FIG. 7, the control unit 205 controls display by the operation unit 204 so that nine types of sheet processing is set as the selection candidate. When the user operates either of buttons BT 701 through 711, the control unit 205 receives a request for executing the sheet processing to be executed by the inline type sheet processing apparatus 200 on the sheet printed by executing the processing target job.

The printing system 1000 can receive a request for executing printing of the job to be processed and a request for executing sheet processing necessary for the job from an external apparatus, such as the PC 103. If a job is input by an external apparatus, it is useful if the same functions as those illustrated in FIG. 7 are displayed on the display unit of the external apparatus, which is a print data transmission source.

An exemplary system configuration of the printing system 1000 will be described in detail below with reference to FIG. 8. FIG. 8 illustrates an exemplary configuration of a sheet postprocessing unit of the printing system 1000 illustrated in FIG. 1.

Referring to FIG. 8, the printing system 1000 includes, as the sheet processing apparatus 200, a large-capacity stacker 200a, a gluing binding machine 200b, and a saddle stitch binding machine 200c. In the example illustrated in FIG. 8, the large-capacity stacker 200a, the gluing binding machine 200b, and the saddle stitch binding machine 200c are connected to the printing apparatus 100 of the printing system 1000 in this order.

The large-capacity stacker 200a is a sheet processing apparatus capable of stacking a large number of sheets (five thousand sheets, for example) conveyed from the printer unit 203. In addition, in the present exemplary embodiment, the gluing binding machine 200b is a sheet processing apparatus configured to execute gluing processing on the sheet for binding a sheet bundle of sheets printed by the printer unit 203 with a cover (i.e., case binding processing). In addition, the gluing binding machine 200b is capable of executing top gluing binding processing for binding a sheet bundle without using a cover. A gluing binding machine is also referred to as a case binding apparatus because the gluing binding machine is a sheet processing apparatus that can at least execute case binding processing.

The saddle stitch binding machine 200c is a sheet processing apparatus capable of selectively execute stapling, punching, cutting, shift paper discharge, saddle stitch binding, and folding processing on the sheet conveyed from the printer unit 203.

In the present exemplary embodiment, the control unit 205 registers various system configuration information about the sheet processing apparatuses on a specific memory as management information necessary for executing various control operations. Now, the control executed by the control unit 205 having the system configuration illustrated in FIG. 8 will be described in detail below.

If the printing system 1000 has the system configuration illustrated in FIG. 8, the printing system 1000 is capable of executing all of the nine types of sheet processing described above. The control unit 205 recognizes that the printing system 1000 can execute the above-described nine types of sheet processing according to the five types of information described above. In addition, based on the recognized content, the control unit 205 controls the UI unit to set all the executable sheet processing, i.e., nine types of sheet processing in total, as selection candidate processing.

In addition, the control unit 205 executes the following control in response to the user operation. The following control of various types of sheet processing executed via the UI unit is added to the print data as an attribute, interpreted by the control unit 205 during processing of the job of the input print data, and executed as a request for executing sheet processing, which is given by the control unit 205 to the sheet processing apparatus.

Suppose that the user has pressed the key 701 (FIG. 7) and that the control unit 205 has received a user request for executing stapling via the UI unit. In this case, in response to the request, the control unit 205 executes control of the saddle stitch binding machine 200c to execute stapling on the sheet that has been printed by executing the job.

Furthermore, suppose that the user has pressed the key 702 (FIG. 7) and that the control unit 205 has received a user request for executing punching (processing for punching the sheet with a hole) via the UI unit. In this case, in response to the request, the control unit 205 executes control of the saddle stitch binding machine 200c to execute punching on the sheet that has been printed by executing the job.

Moreover, suppose that the user has pressed the key 707 (FIG. 7) and that the control unit 205 has received a user request for executing case binding via the UI unit. In this case, in response to the request, the control unit 205 executes control of the gluing binding machine 200b to execute case binding of the bundle of sheets that have been printed by executing the job.

Furthermore, suppose that the user has pressed the key 709 (FIG. 7) and that the control unit 205 has received a user request for executing mass stacking processing (processing for punching the sheet with a hole) via the UI unit. In this case, in response to the request, the control unit 205 executes control of the large-capacity stacker 200a to execute mass stacking of the sheets that have been printed by executing the job.

Now, an exemplary system configuration of the printing system 1000 according to the present exemplary embodiment will be described in detail below with reference to FIG. 8. Referring to FIG. 8, the sheet that has been printed by the printer unit 203 of the printing apparatus 100 is conveyed into each sheet processing apparatus 200. More specifically, as illustrated in FIG. 8, the sheet processing apparatuses 200 convey the sheet among them via points A, B, and C.

It is useful if each of the sheet processing apparatuses 200 illustrated in FIG. 8 includes a function for conveying the sheet even if sheet processing by each sheet processing apparatus is not executed on the sheet. More specifically, suppose that only the case binding processing by the gluing binding machine 200b, among the sheet processing apparatuses 200, is executed on the sheet. In this case, it is necessary for the large-capacity stacker 200a to receive the sheet from the printing apparatus 100 and convey the received sheet to the gluing binding machine 200b. In other words, the sheet processing apparatus 200 includes a function for receiving a printed sheet from an upstream sheet processing apparatus 200 and conveying the sheet to a downstream sheet processing apparatus 200 even if the sheet processing apparatus 200 does not execute sheet processing on the sheet.

In addition, if a plurality of downstream sheet processing apparatuses 200 does not execute sheet processing, it is useful if the sheet processing apparatus 200 discharges the sheet without conveying the sheet to the downstream sheet processing apparatuses 200. As described above, the sheet processing apparatus 200 of the printing system executes paper handling control for controlling the conveyance of the sheet according to the print job request.

For paper discharge destinations Z illustrated in FIG. 8, a plurality of candidates exists. The paper discharge destinations Z will be described in detail below with reference to FIG. 10.

Now, an inner configuration of the inline type sheet processing apparatus 200 connected to the printing apparatus 100 of the printing system 1000 will be described in detail below with reference to FIGS. 9 and 10.

Figure 9:
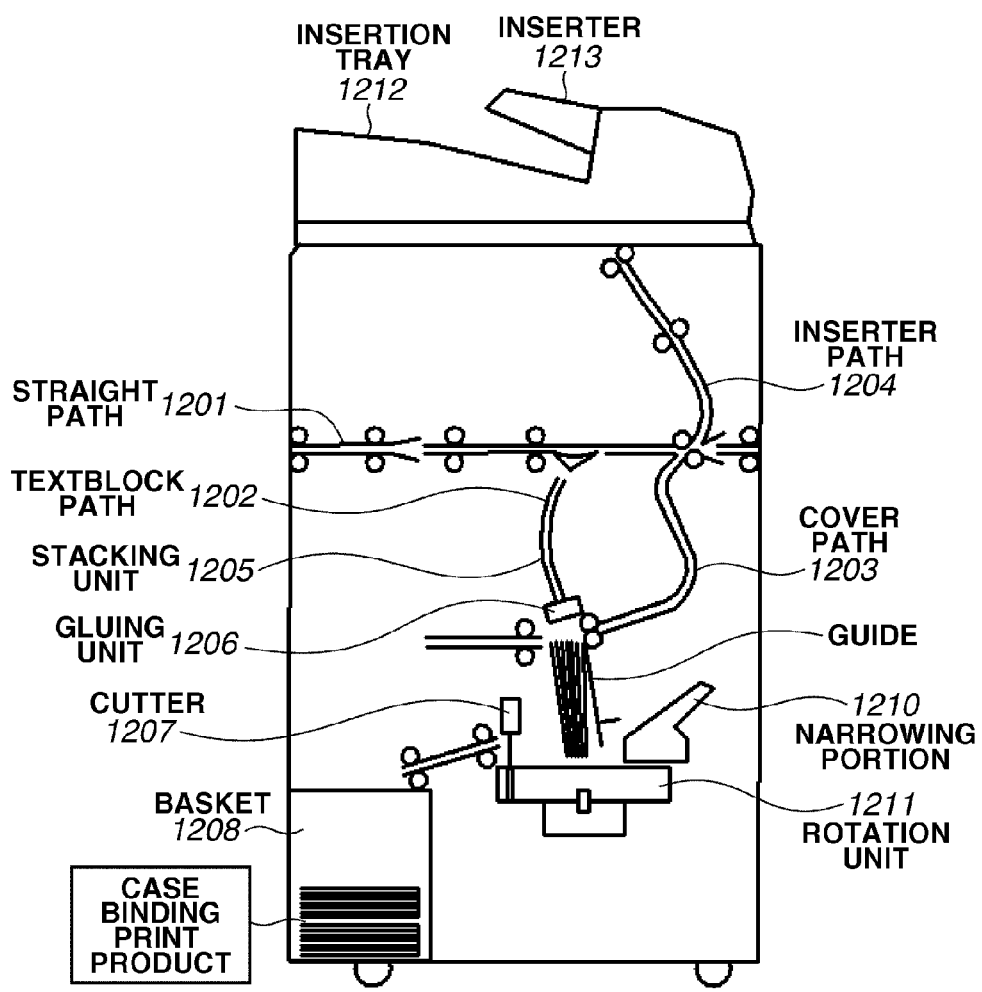
FIG. 9 is a cross section of an exemplary inner configuration of a gluing binding machine.

FIG. 9 is a cross section of an exemplary inner configuration of the gluing binding machine 200*b* of the printing system 1000 illustrated in FIG. 1. Referring to FIG. 9, the gluing binding machine 200*b* includes four conveyance paths including a straight path 1201, a textblock path 1202, a cover path 1203, and an inserter path 1204. In addition, the gluing binding machine 200*b* includes a stacking portion 1205, a gluing unit 1206, a cutter 1207, a basket portion 1208, a guide 1209, a narrowing portion 1210, a rotation unit 1211, an insertion tray 1212, and an inserter 1213.

The straight path (a through path) 1201 is a conveyance path having the same function as that of a straight path 1101 of the large-capacity stacker 200*a*. Accordingly, the detailed description of the straight path 1201 and a signal line thereto will be omitted.

The textblock path 1202 and the cover path 1203 are sheet conveyance paths used in generating a case-bound print product. More specifically, the textblock path 1202 is a conveyance path for conveying a sheet for a textblock of a case-bound print product. The cover path 1203 is a conveyance path for conveying a cover sheet. In the present exemplary embodiment, a sheet bundle of sheets for the text, on which print data of the text has been printed by case binding, is referred to as a "textblock".

The printing system 1000 having the above-described configuration, suppose that the control unit 205 has received a request for executing case binding processing from the user via the UI unit by operating the key 707 (FIG. 7). In this case, the control unit 205 executes the following control.

At first, the control unit 205 serially stacks the sheets printed by the printer unit 203 in the stacking portion 1205 via the textblock path 1202. Furthermore, the control unit 205 stacks the sheets of all pages having the text data printed thereon in the stacking portion 1205. Then, the control unit 205 conveys the cover sheet via the cover path 1203.

The cover sheet can be supplied from the insertion tray 1212 of the inserter 1213 of the gluing binding machine 200*b* as illustrated in FIG. 9. In this case, the cover sheet is conveyed into the inserter path 1204. Alternatively, the cover sheet, after being printed by the printing apparatus 100, can be supplied from an upstream apparatus into the straight path 1201.

Furthermore, the control unit 205 conveys the sheet printed and conveyed by either one of the above-described methods into the cover path 1203 as the cover sheet. Then, the control unit 205 executes control for pausing the conveyance of the cover sheet in a lower portion of the stacking portion 1205. In parallel to the operation, the control unit 205 executes gluing of all the text page sheets (the textblock) stacked on the stacking portion 1205.

More specifically, after applying a specific amount of glue on the bottom portion of the text block and after the glue has been entirely applied, the gluing unit 1206 causes the glued portion of the textblock to contact the center portion of the cover sheet to case-bind the textblock in an overlapping manner.

After binding the textblock, the gluing unit 1206 presses the case-bound textblock downwards. Accordingly, the case-bound textblock slides downwards onto the rotation unit 1211 along the guide 1209. Then, the guide 1209 guides and moves the case-bound textblock so that the case-bound textblock is placed on the rotation unit 1211 on the cover. Furthermore, the control unit 205 aligns the position of the case-bound textblock now placed on the rotation unit 1211 on its cover by using the narrowing portion 1210. After aligning the position of the textblock, the control unit 205 trims the textblock at the edge portion thereof by using the cutter 1207.

Then, the control unit 205 rotates the rotation unit 1211 by 90 degrees to align the position of the textblock by using the narrowing portion 1210 and trim the top portion of the textblock by using the cutter 1207. After the trimming, the control unit 205 presses the case-bound and trimmed textblock downwards onto the basket portion 1208 by using the narrowing portion 1210. After the glue is dried up in the basket portion 1208, the user can take out the postprocessed case-bound product.

The number of sheets to be processed by case binding processing is extremely larger than the number of sheets processed by the sheet processing different from the gluing binding processing. More specifically, in the case binding processing, up to two hundred sheets can be processed as one textblock sheet bundle. On the other hand, up to twenty sheets can be processed as one textblock sheet bundle in stapling processing. In the saddle stitch binding processing, up to fifteen sheets can be processed as one textblock sheet bundle.

As described above, the number of printed sheets that can be subjected to sheet processing as one sheet bundle in the gluing binding processing is far larger than that in other sheet processing. In the present exemplary embodiment, the inline type sheet processing apparatus is capable of executing gluing binding processing, such as the case binding processing, under control of the control unit 205.

Figure 10:
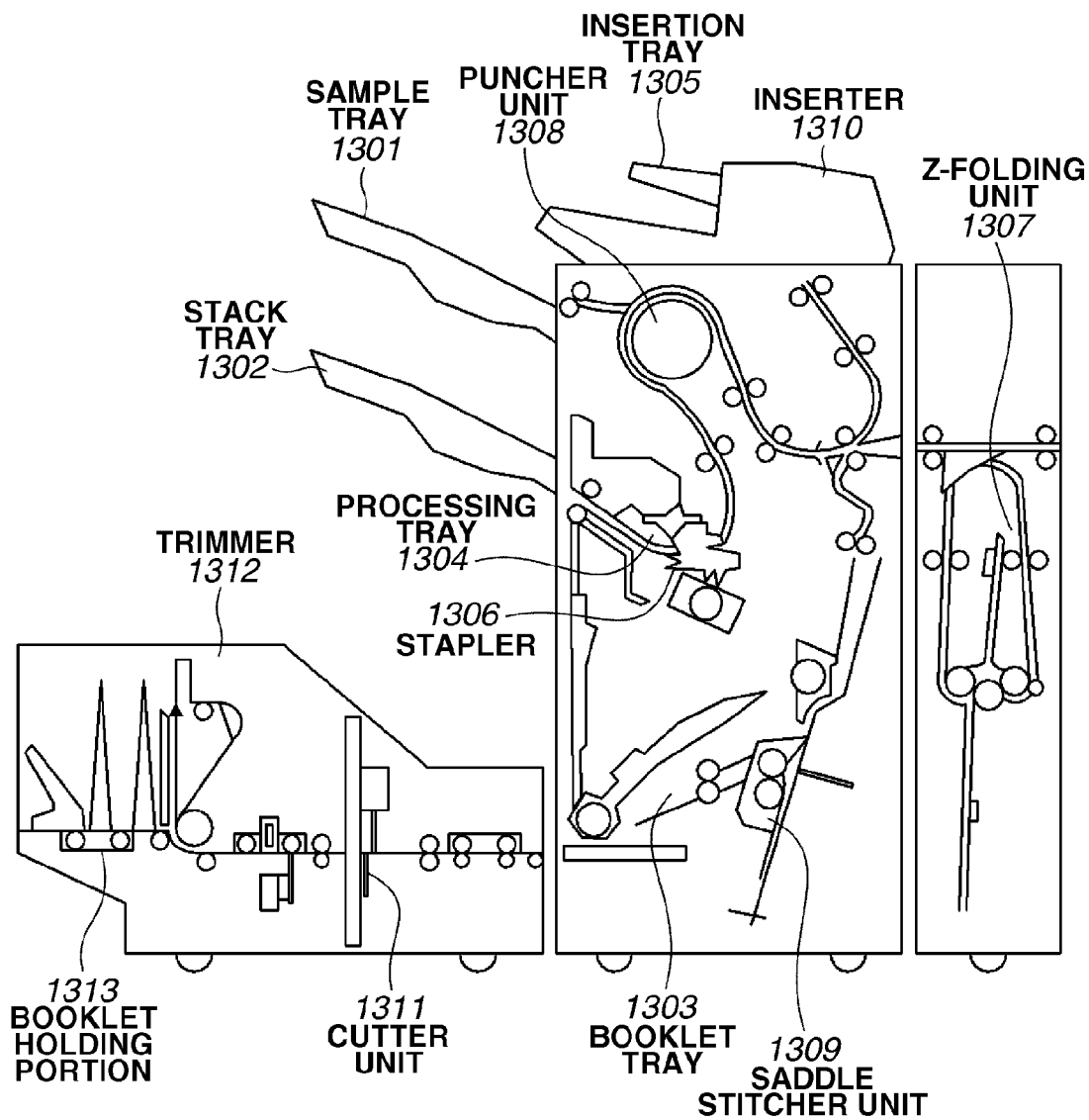
FIG. 10 is a cross section of an exemplary inner configuration of a saddle stitch binding machine.

FIG. 10 is a cross section of an exemplary inner configuration of the saddle stitch binding machine 200*c* of the printing system 1000 illustrated in FIG. 1. The saddle stitch binding machine 200*c* includes various units for selectively executing stapling, trimming (cutting), punching, and folding on the sheet conveyed from the printing apparatus 100. However, the saddle stitch binding machine 200*c* does not include a through path, which may function as a unit for conveying a sheet to a downstream apparatus, as its functional restriction.

On a sheet conveyance path of the saddle stitch binding machine 200*c*, a plurality of sheet detection sensors for detecting the status of conveying the sheet is provided. Each sheet detection sensor can detect a paper jam, if any has occurred. A CPU (not illustrated) of the saddle stitch binding machine 200*c* notifies sheet detection information from each sensor to the control unit 205 via a signal line used for data communication with the control unit 205. The control unit 205 recognizes the sheet detection status within the saddle stitch binding machine 200*c* or a paper jam, if any has occurred, according to the information from the saddle stitch binding machine 200*c*.

For the system configuration of the printing system 1000, between the sheet processing apparatus 200 and the printing apparatus 100, another sheet processing apparatus 200 may be connected in cascade. In this case, a CPU of another sheet processing apparatus 200 notifies information about the saddle stitch binding machine 200*c* to the control unit 205. As described above, the printing system 1000 has a configuration uniquely employed when an inline finisher is used.

The saddle stitch binding machine 200*c* includes a sample tray 1301, a stack tray 1302, a booklet tray 1303, a processing tray 1304 and an insertion tray 1305. In addition, the saddle stitch binding machine 200*c* includes a stapler 1306, a z-folding machine 1307, a puncher 1308, a saddle stitcher unit 1309, and an inserter 1310. Furthermore, the saddle stitch binding machine 200*c* includes a cutter unit 1311, a trimmer 1312, and a booklet holding portion 1313.

The control unit 205 changes the unit to be utilized according to the type of the input job and the number of sheets to be discharged. More specifically, suppose that the control unit 205 has received a user request input via the UI unit by operating the key 701 (FIG. 7) for executing stapling, which can be executed by the saddle stitch binding machine 200c.

In this case, the control unit 205 conveys the sheet from the printer unit 203 onto the stack tray 1302. More specifically, before the sheets are discharged onto the stack tray 1302, the control unit 205 serially stacks the sheets for each job onto the processing tray 1304. Then, the control unit 205 binds the sheet bundle by using the stapler 1306, which is provided on the processing tray 1304. Furthermore, the sheet bundle is discharged onto the stack tray 1302. In the above-described manner, the bundle of sheets printed by the printer unit 203 is stapled.

If the user has designated z-folding processing, the control unit 205 controls the z-folding machine 1307 to execute folding processing on the sheet and to discharge the resulting folded sheet onto the stack tray 1302 or the sample tray 1301. If the user has designated punching processing, the control unit 205 controls the puncher 1308 to execute punching on the sheet and to discharge the resulting punched sheet onto the stack tray 1302 or the sample tray 1301.

After binding the sheet at two positions in the center of the sheet, the saddle stitcher unit 1309 twofolds the sheet by causing the center of the sheet to engage the roller. In this manner, the saddle stitcher unit 1309 executes saddle stitch binding processing for generating a booklet, such as a leaflet. After being bound by the saddle stitcher unit 1309, the sheet is discharged on the booklet tray 1303. Whether the sheet processing by the saddle stitcher unit 1309, such as binding processing, can be executed is determined according to the sheet processing setting set by the user for the job to be output as described above.

The inserter 1310 is a unit configured to feed the sheet set on the insertion tray 1305 to the stack tray 1302 or the sample tray 1301 without causing the sheet to go through the printer. With the above-described configuration, the saddle stitch binding machine 200c can insert the sheet set on the inserter 1310 between the sheets to be conveyed into the saddle stitch binding machine 200c (i.e., the sheet printed by the printer unit 203).

The user sets sheets on the insertion tray 1305 of the inserter 1310 in a face-up state. The sheets are serially fed by a pickup roller starting from a first sheet from the top of the set of sheets. Then, the sheet from the inserter 1310 is discharged onto the stack tray 1302 or the sample tray 1301 in this state. Accordingly, the sheet is discharged in a face-down state.

In conveying the sheet to the saddle stitcher unit 1309, the control unit 205 aligns the orientation of the face of the sheet by once conveying the sheet towards the puncher 1308 and then switching back the sheet. Whether the sheet processing by the inserter 1310, such as sheet insertion processing, is performed, is determined according to the sheet processing setting set by the user to the job to be output as described above.

The output product that has now become a saddle stitched booklet after being postprocessed by the saddle stitch binding machine 200c is then conveyed to the trimmer (trimming unit) 1312. More specifically, at first, the booklet output product is fed by the roller by a predetermined length. Furthermore, the product is then trimmed by the cutter 1311 by a predetermined length. After being trimmed by the trimmer 1312, the uneven edges of the sheets corresponding to a plurality of pages of the booklet can be appropriately aligned. Then, the booklet is held in the booklet holding portion 1313. Whether the sheet processing by the trimmer 1312, such as trimming (cutting) processing, can be executed is determined based on the sheet processing setting set by the user to the job to be output as described above.

Figure 11:
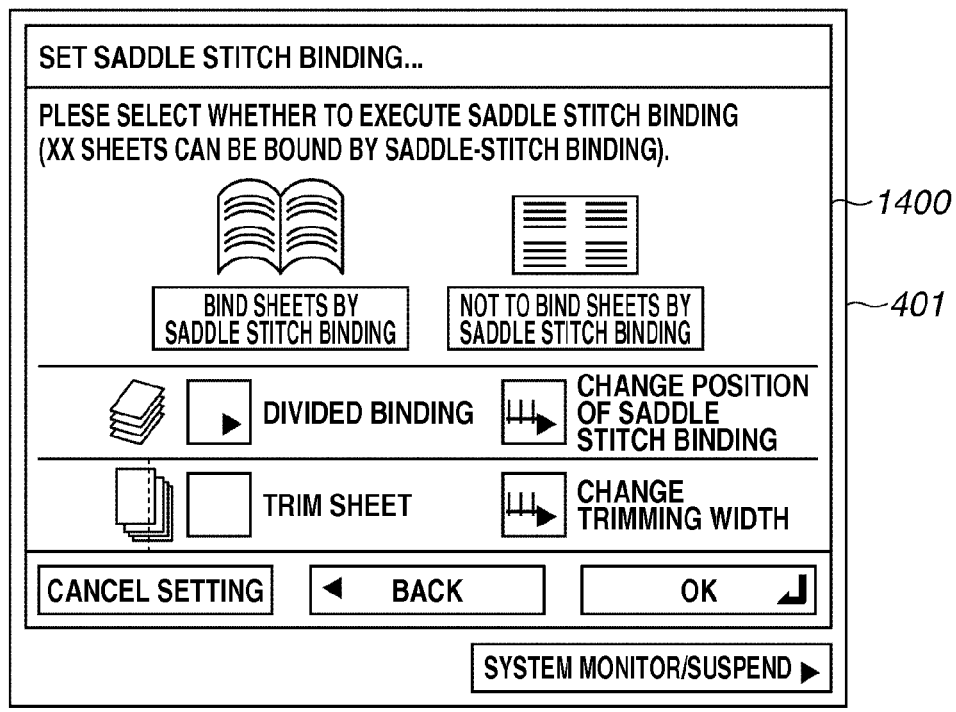
FIG. 11 illustrates an example of a UI displayed on the touch panel unit.

When the user has selected saddle stitch binding by pressing the key 705 (FIG. 7), the control unit 205 executes control for displaying a screen illustrated in FIG. 11 on the UI unit. FIG. 11 illustrates an example of a UI displayed on the touch panel unit 401 (FIG. 4).

The control unit 205 can receive a detailed setting of the saddle stitch binding processing, which is set by the user, via the setting screen 1400 illustrated in FIG. 11. Referring to FIG. 11, the user can designate whether to actually execute the saddle stitch binding on the center of the sheet by using staples via the setting screen 1400.

In addition, the user can input a setting of divided binding, changing of positions of saddle stitch binding, whether to trim the booklet, and changing of the trimming width via the setting screen 1400. More specifically, if the user has selected "bind sheets by saddle stitch binding" and "trim sheet" via the setting screen 1400, then the control unit 205 controls the printing system 1000 to execute processing for generating a printed and postprocessed product having the appearance illustrated in FIG. 12A as a result of executing printing and saddle stitch binding on the job to be processed.

Figure 12A:
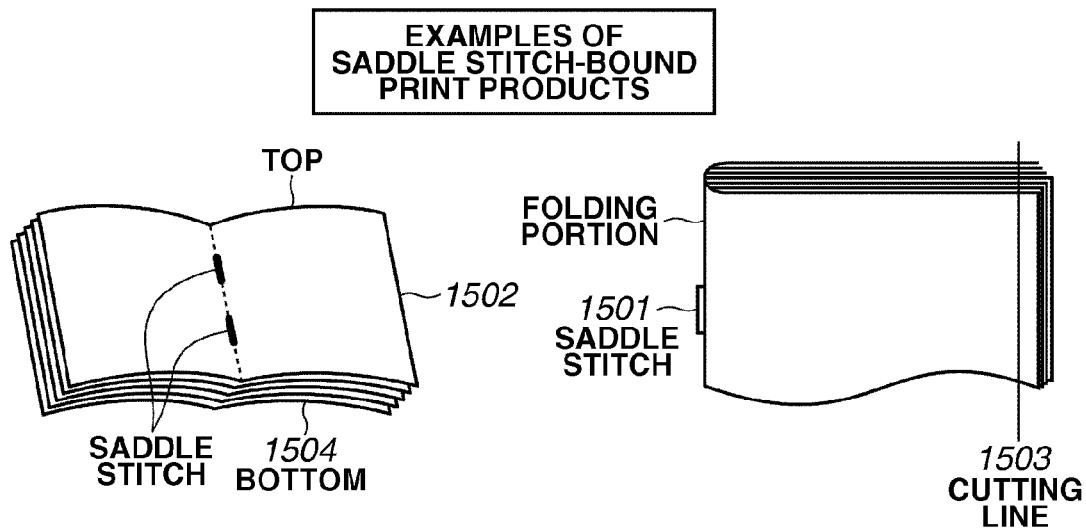
FIGS. 12A and 12B illustrate a postprocessed sheet printed by the printing system.
Figure 12B:
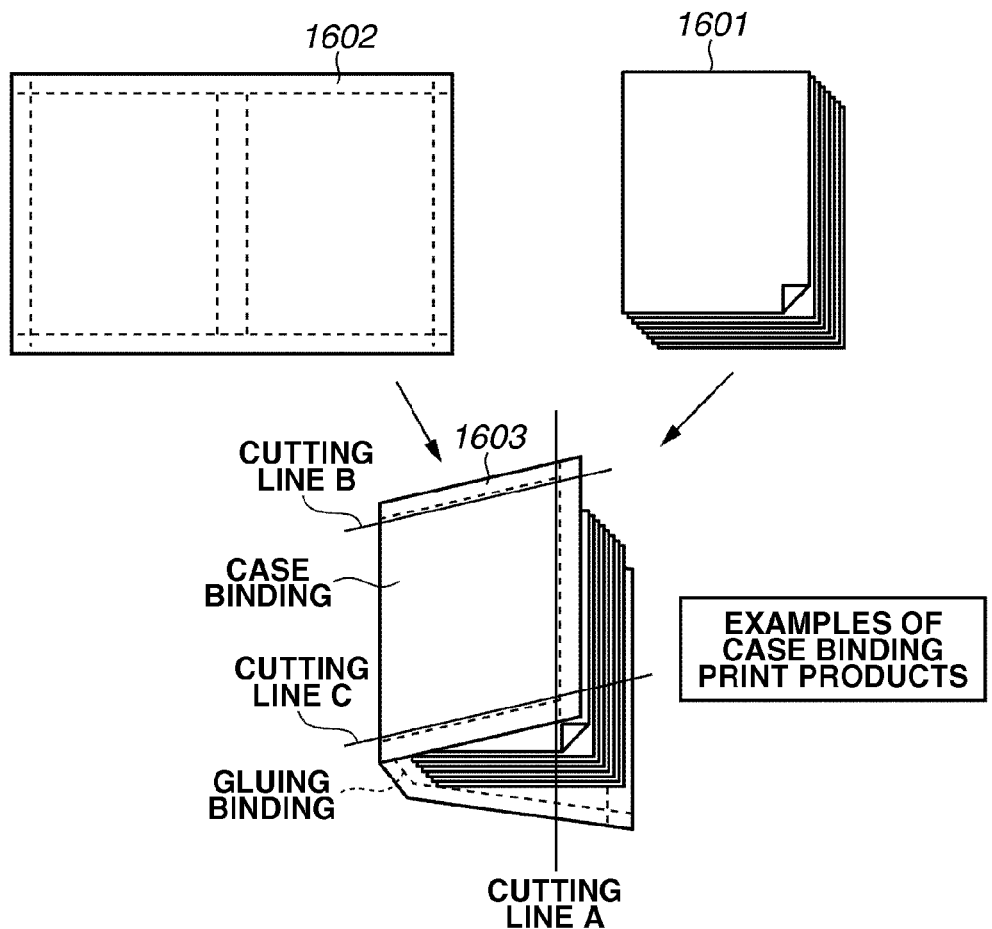

FIGS. 12A and 12B illustrate a postprocessed sheet printed by the printing system 1000 according to the present exemplary embodiment. More specifically, FIG. 12A illustrates an example of a print product bound by saddle stitch binding. FIG. 12B illustrates an example of a print product bound by case binding.

Referring to FIG. 12A, saddle stitches 1501 are provided in the center of the sheet bundle. An edge 1502 of the sheet bundle is trimmed along a trimming (cutting) line 1503. If the positions of the saddle stitches 1501 and the trimming line 1503 are previously set, the position of the saddle stitch binding can be changed to a desired position.

If the case binding processing has been set by the user by operating the key 707 illustrated in FIG. 7, the control unit 205 controls the printing system 1000 to generate a product having an appearance illustrated in FIG. 12B as a result of executing printing and case binding on the job to be processed.

FIG. 12B illustrates an example of a product of case binding processing according to the present exemplary embodiment. During case binding processing, a textblock 1601 is bound with a cover 1602. Then, the case-bound textblock is trimmed along a set trimming line.

As illustrates to FIG. 12B, for the print product to be bound by case binding, a trimming width can be set to each of trimming lines A through C differently from one another.

On the sheet bundle, outside each of the trimming lines (trimming positions) A through C, a supplementary region 1603 is provided. In the following description, the supplementary region 1603 is also referred to as a specific (first) region 1603. The region on the sheet surrounded by the trimming lines (positions) A through C is referred to as a "second region".

The supplementary region 1603 includes a supplementary object printed therein. The supplementary object includes register mark that regulates the finishing size (the dashed lines and the trimming lines A through C illustrated in FIG. 12B), color bars for adjusting the density of toners used by the printing apparatus 100, and a bleed that functions as a supplementary mark for trimming. Furthermore, the supplementary object includes page information, which includes a file name or a page number. The supplementary region 1603, which includes the above-described object printed therein, is discarded after trimming.

In terms of reasonable consumption of an ink or a toner, it is useful to reduce the number of objects printed in the supplementary region 1603 to a minimum. However, if an apparatus as described in the present exemplary embodiment, which includes an inline finisher, is used, it is useful to use a color bar printed on the supplementary region 1603 to verify the variation of an output color for each page. Therefore, it may become necessary to verify the tint by looking at the trimming fragment after the trimming. In addition, the file information printed in the supplementary region 1603 is useful as a method for verifying whether a desired document or page has been surely included in the finished product by looking at the trimming fragment after the trimming.

Figure 13:
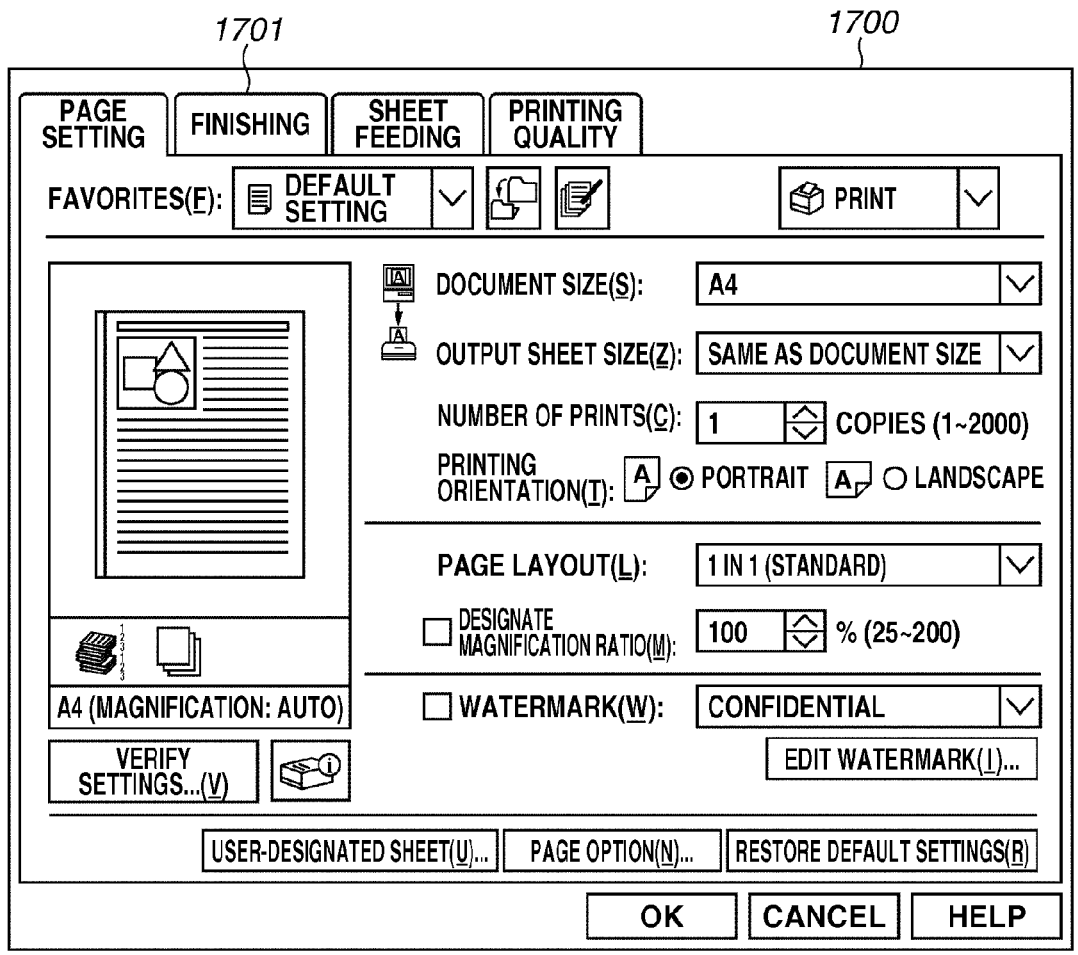
FIG. 13 illustrates an example of a UI displayed by a host computer.
Figure 14:
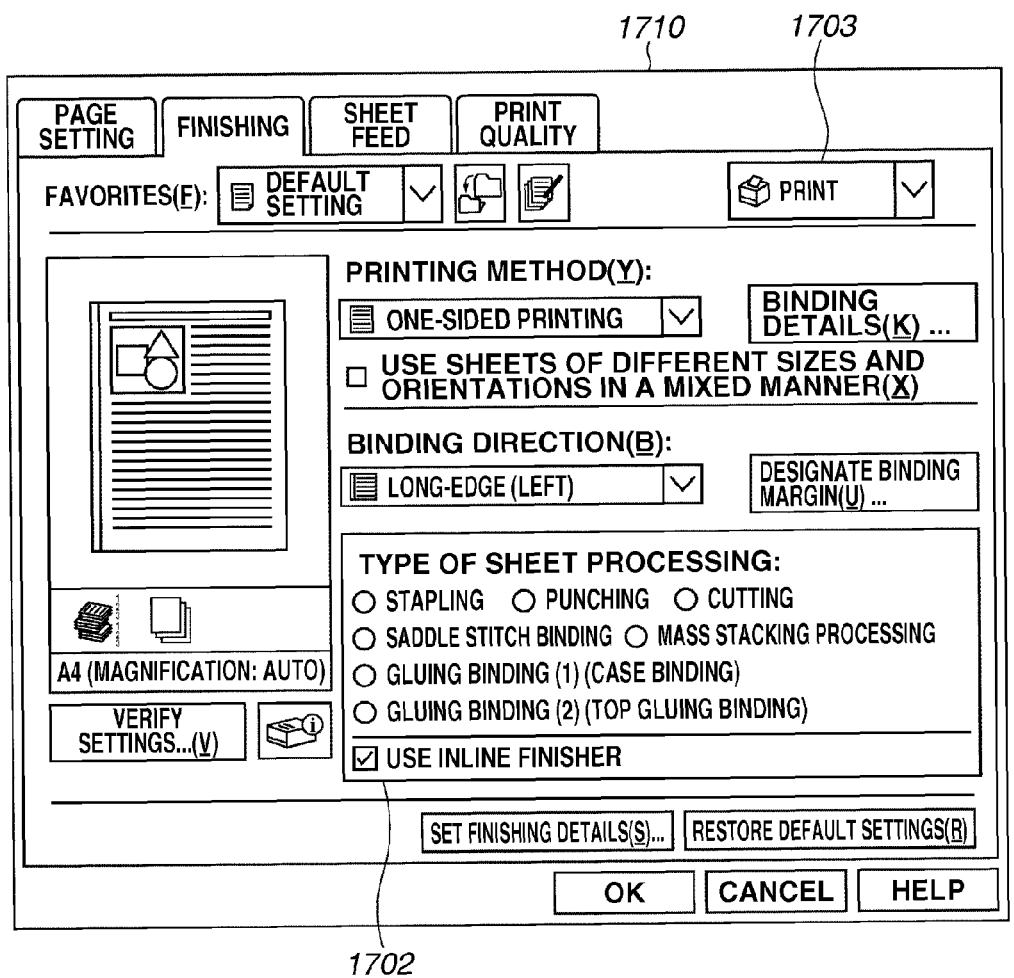
FIG. 14 illustrates an example of a UI displayed by the host computer.
Figure 15:
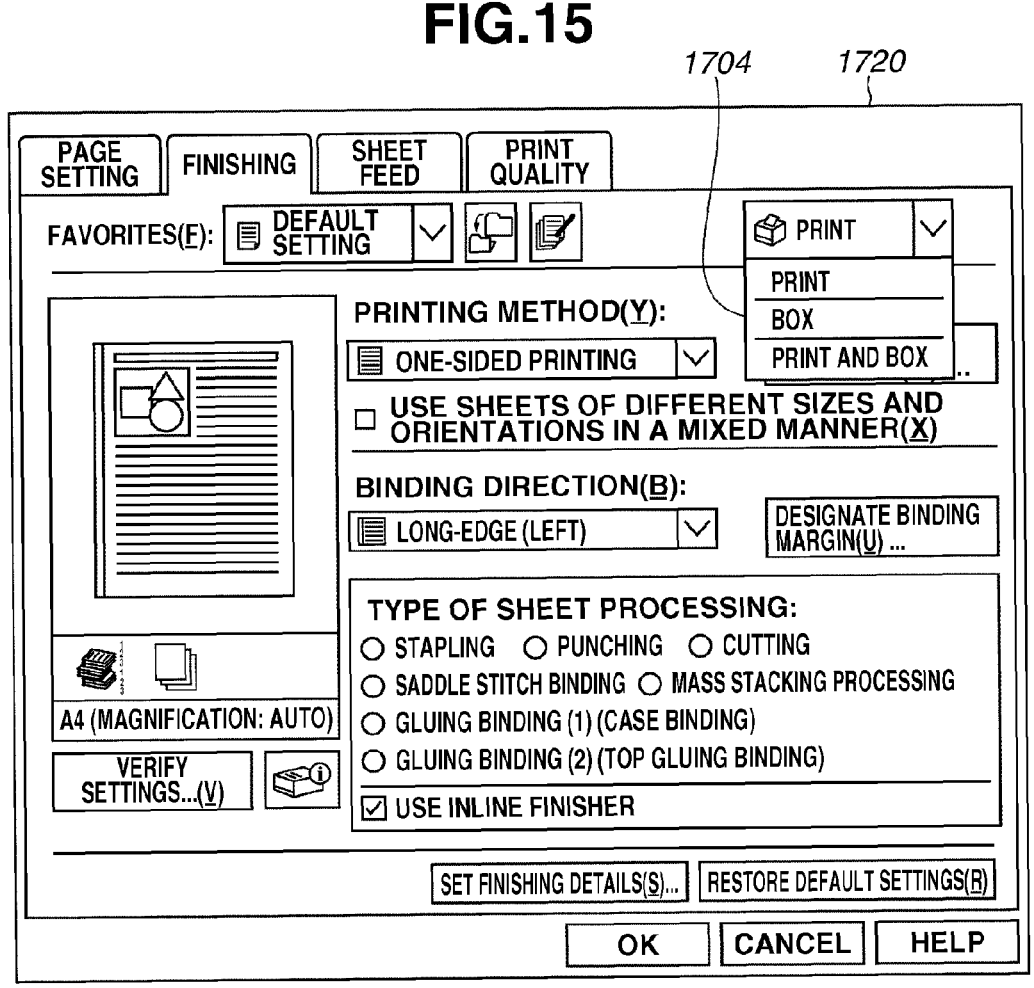
FIG. 15 illustrates an example of a UI displayed by the host computer.

FIGS. 13 through 15 illustrate examples of user interfaces displayed on the host computer 103 (FIG. 1). In the following description, a case where the printing system 1000 is utilized from the host computer (external apparatus) 103 will be described in detail.

More specifically, in executing a program for implementing various processing and control according to the present exemplary embodiment from a host computer (the PC 103 illustrated in FIG. 1) by downloading the program from a page of a web site (a data supply source) or from a specific storage medium, a control unit of the external apparatus (the PC 103 (FIG. 1)) executes the following control.

Suppose that a user of the host computer 103 has input an instruction for activating a printer driver for operating the printing apparatus 100 of the printing system 1000 by operating a mouse or a keyboard of the host computer 103. In this case, the CPU (the control unit) of the host computer 103 executes control for displaying a print setting screen 1700 (FIG. 13) on a display unit of the host computer 103.

If the user of the host computer 103 has pressed a finishing key 1701 via the print setting screen 1700 by operating the mouse, then the CPU of the host computer 103 executes control of the display unit for shifting from the print setting screen 1700 to a print setting screen 1710 illustrated in FIG. 14. Furthermore, the CPU of the host computer 103 displays a plurality of types of available sheet processing on the display unit. Thus, the user is allowed to select whether to execute the designated sheet processing on the inline type sheet processing apparatus 200 of the printing system 1000.

In a sheet processing setting field 1702, which is displayed on the print setting screen 1710 (FIG. 14), a plurality of types of sheet processing that can be executed on the inline type sheet processing apparatus 200 included in the printing system 1000 is displayed. Alternatively, a plurality of types of sheet processing that can be executed on a non-inline type sheet processing apparatus, such as the z-folding machine 1307, the trimmer 1312, the saddle stitch binding machine 200c, or the gluing binding machine (case binding machine) 200b can be displayed.

If the user of the host computer 103 has pressed a "designate output destination" key 1703 via the print setting screen 1710 by operating the mouse, then the CPU of the host computer 103 controls the display unit to change the screen from the print setting screen 1710 to a print setting screen 1720 illustrated in FIG. 15. The CPU further executes control for displaying a pulldown menu 1704. The user can select the type of the output destination, such as "print", "store in box", or "store in box after printing", via the pulldown menu 1704.

Alternatively, the printing system 1000 of the present invention can display another setting screen different from those illustrated in FIGS. 13 through 15. More specifically, any setting screen displayed on the external apparatus described above, which can implement various functions (processing and control) according to the present exemplary embodiment, can be used instead of the screens illustrated in FIGS. 13 through 15.

If the user has selected desired sheet processing and an output destination via the sheet processing setting field 1702 and pressed an OK key after that, the CPU of the host computer 103 associates a command (job ticket) describing various print conditions set by the user via the print setting screen with a series of pieces of print data to be printed by the printer unit 203 as one job. Then, the CPU of the host computer 103 transmits the job to the printing system 1000 via the network 101.

Then, the external I/F unit 202 of the printing system 1000 receives the job from the host computer (PC) 103. After receiving the job, the control unit 205 of the printing system 1000 executes control of the printing system 1000 for processing the job received from the host computer 103 according to the processing condition set by the user on the host computer 103.

Figure 16A:
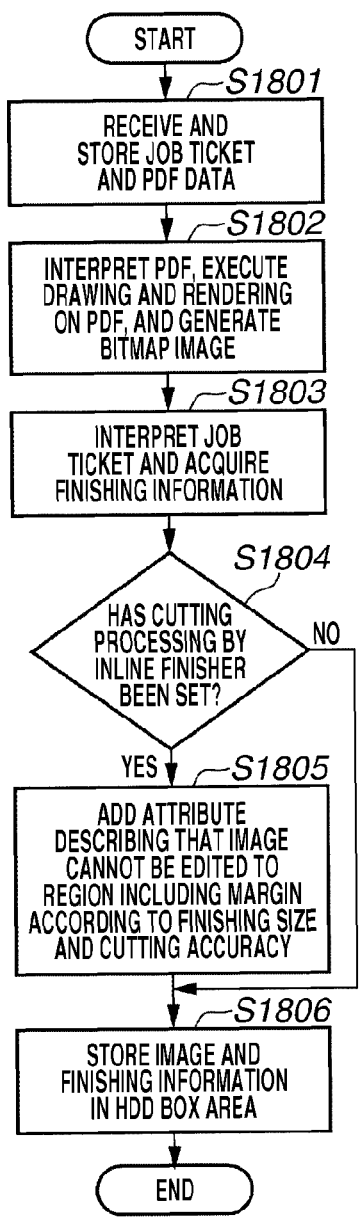
FIGS. 16A and 16B are flow charts illustrating exemplary flows of control processing executed by the printing system.
Figure 16B:
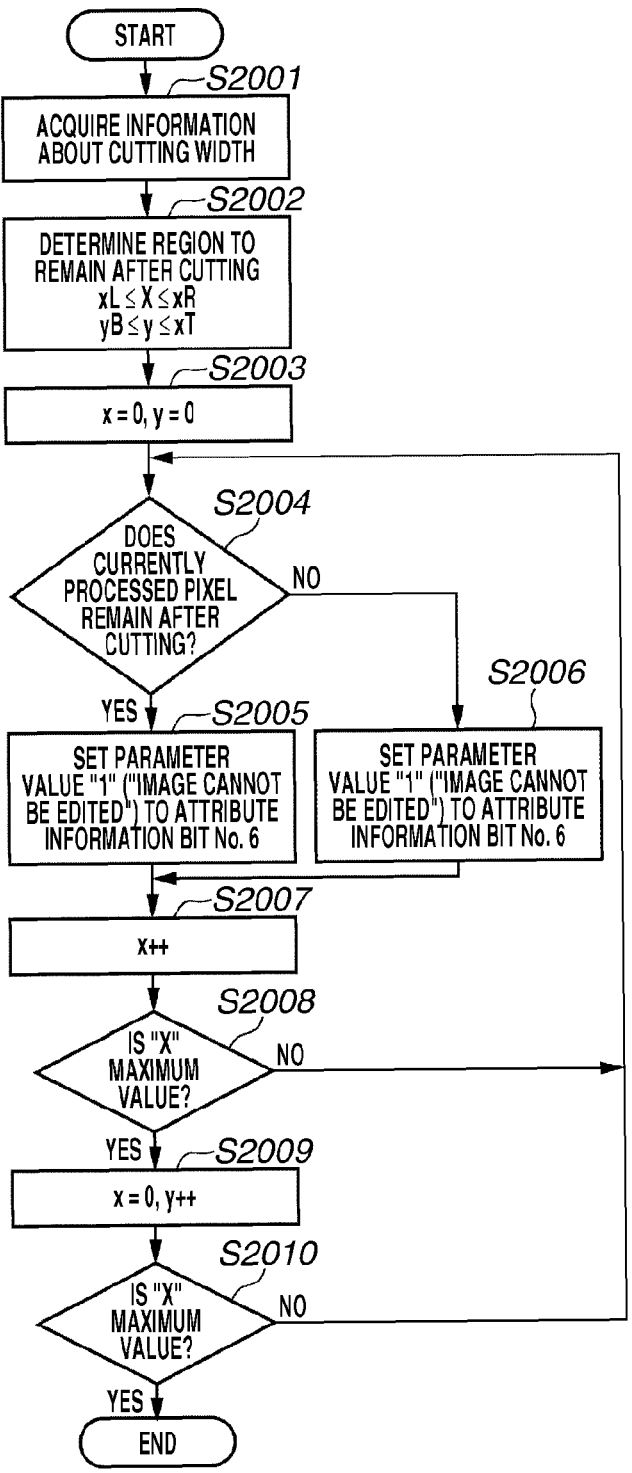

FIGS. 16A and 16B are flow charts illustrating exemplary flows of control processing executed by the printing system 1000 according to the present exemplary embodiment. More specifically, FIG. 16A is a flow chart illustrating an exemplary flow of processing for storing a PDL document to which finishing information is added in the box. FIG. 16B is a flow chart illustrating in detail an exemplary flow of the processing executed according to the processing illustrated in FIG. 16A. Each of steps S1801 through S1806 and processing in each of steps S2001 through S2010 is implemented by the control unit 205 by loading and executing, on the RAM 208, a control program stored on the ROM 207 and the HDD 209.

Referring to FIG. 16A, in step S1801, the control unit 205 receives a job ticket and PDF data (i.e., a print job). Furthermore, the control unit 205 stores the received job ticket and PDF data on the HDD 209.

More specifically, in step S1801, the printing apparatus 100 receives the print job via a user interface of an external apparatus that can execute data communication with the printing apparatus 100. Alternatively, the printing apparatus 100 can receive a print job via a user interface of the printing apparatus 100, such as the operation unit 204.

In step S1802, the control unit 205 executes raster image processing (RIP) on the PDF data. Furthermore, the control unit 205 interprets and renders the PDF data and generates bitmap data based on the PDF data. In step S1803, the control unit 205 interprets the job ticket and acquires the finishing information. In the present exemplary embodiment, the finishing information refers to information about the type of sheet processing and the detailed content of the designated sheet processing.

More specifically, the type of sheet processing includes information about which types of sheet processing, which includes stapling, punching, cutting, shift paper discharge, saddle stitch binding, folding, case binding, top gluing binding, and mass stacking, is to be executed. The detailed information includes information whether three-side trimming or one-side trimming is to be executed, the number of sides (edges) to be trimmed, the width of the region of the sheet to be cut off, punching position information about the number of holes (two or more) to be provided to the sheet, and staple position information about the type of stapling to be executed on the sheet (i.e., single stapling or double stapling).

In step S1804, the control unit 205 determines whether in-line trimming has been designated. If it is determined that trimming by using the inline finisher (the inline type sheet processing apparatus 200) has been designated as the trimming method (YES in step S1804), then the processing advances to step S1805. On the other hand, if it is determined that trimming by using the inline finisher has not been designated (NO in step S1804), then the processing advances to step S1806.

In step S1805, the control unit 205 changes object attribute information about the RIP-processed image. The control unit 205 adds an image editing inhibition attribute to each pixel existing inside a rectangle that indicates the finishing size (the size of the sheet after the sheet is trimmed) by the inline finisher. The rectangle indicating the finishing size corresponds to the above-described second region, which is a region surrounded by the trimming lines (trimming positions) A through C.

To paraphrase this, with respect to each pixel existing inside the rectangle indicating the finishing (trimming) size, the control unit 205 changes a specific bit (a pixel value) (a sixth bit, for example) of the object attribute information (image information) about the pixel to a value "1". By changing the pixel value to "1", each pixel existing inside the rectangle indicating the finishing (trimming) size is not to be subjected to image processing by the user. Then, the processing advances to step S1806.

In step S1806, the control unit 205 stores the RIP-processed image (including the object attribute information) and the finishing information in the box storage region of the HDD 209. Then the processing ends.

In the example illustrated in FIG. 16A, a job ticket is used as an example of the finishing information data included in the print job. Furthermore, PDF data is used as an example of the data of a PDL document. However, the formats of the finishing information and the PDL document described above that can implement the present invention are not limited to those described above. More specifically, the present invention can be implemented by another format if an interpretation unit compliant with another format is provided.

FIG. 16B is a flow chart illustrating an exemplary flow of processing for changing the object attribute of the RIP-processed image, which is executed in step S1805 (FIG. 16A). Referring to FIG. 16B, in step S2001, the control unit 205 acquires information about the size of the region to be cut off from the sheet by using the inline finisher, which is included in the finishing information, from a memory (not illustrated) of the gluing binding machine 200b connected to the printing apparatus 100.

In step S2002, the control unit 205 determines the region to remain after the trimming, on the RIP-processed image, based on paper size information and trimming amount (width) information. More specifically, the control unit 205 acquires information about the distance from the edge of the spine to the trimming line A (P mm), information about the distance from the edge of the sheet to the trimming line B (Q mm), and information about the distance between the trimming lines B and C (R mm). Furthermore, the control unit 205 determines the trimming line on the RIP-processed image.

Values of the acquired information can be stored on a memory of the gluing binding machine 200b previously to actual trimming. If a plurality of types of sheets of different sizes is to be trimmed, different values P, Q, and R can be stored for each sheet type. In other words, for the values P, Q, and R for an A3-size sheet, values P, Q, and R larger than those for an A4-size sheet can be set.

Furthermore, the control unit 205 acquires the values P, Q, and R which are previously stored on the memory of the sheet processing apparatus 200, such as the gluing binding machine 200b, in the above-described manner. Based on the acquired values P, Q, and R, the control unit 205 can identify and determine an appropriate trimming position (line) for each sheet processing apparatus 200 connected to the printing apparatus 100.

The trimming position can be expressed in a coordinate system of the RIP-processed image. More specifically, the trimming position can be expressed by using an x-coordinate minimum value (xL), an x-coordinate maximum value (xR), a y-coordinate minimum value (yB), and a y-coordinate maximum value (yT) of the region to remain after the trimming. The control unit 205 determines the region surrounded by the x-coordinate minimum value (xL), the x-coordinate maximum value (xR), the y-coordinate minimum value (yB), and the y-coordinate maximum value (yT) remains after the trimming. Furthermore, regions other than the region to remain after the trimming is determined to be cut off by the trimming.

If the spine of the sheet bundle (FIG. 12B), which is a product of the printing and the case binding processing, is determined as a reference point (the origin ("0")), the x-coordinate minimum value (xL) corresponds to the value 0 and the x-coordinate maximum value (xR) denotes the coordinate of the trimming line A.

Similarly, if the bottom edge of the sheet bundle (FIG. 12B), which is a product of the printing and the case binding processing, is determined as the reference point (the origin ("0"), the y-coordinate minimum value (yB) denotes the trimming line C and the y-coordinate maximum value (yT) denotes the trimming line B.

The above-described method for identifying the coordinates is a mere example. In other words, the control unit 205 can identify the coordinates by using a method other than the above-described method and express the identified coordinates on the RIP-processed image. In steps S2003 through S2010, the control unit 205 executes loop processing for changing the object attribute information about each pixel while scanning the RIP-processed image in x and y directions.

As characteristic to the present invention, after determining whether a pixel existing in a region to remain after the trimming or a region to be cut off by the trimming each pixel is included in step S2004, then in step S2005, the control unit 205 changes the sixth bit of the object attribute information of each pixel existing in the region to remain after the trimming to the value "1". With the above-described configuration, when a box image editing function, which is to be described in detail below, is used, the present exemplary embodiment can appropriately inhibit image processing not desired by the user.

The region whose sixth bit of the object attribute information has been changed to "1" corresponds to the region to remain after the trimming. Accordingly, when the box image editing function is used, the control unit 205 executes control for displaying the difference between the region to remain after the trimming and the region to be cut off by the trimming as a preview image displayed on a user interface that enables the user to visually verify the difference. By executing the loop processing in steps S2003 through S2010 is completed, the object attribute information of all the pixels is determined.

Now, the box image preview function and an image editing function according to the present exemplary embodiment will be described in detail below with reference to FIGS. 17 and 18, respectively. FIG. 17 illustrates an example of a user interface displayed on the touch panel unit 401 (FIG. 4). The UI screen illustrated in FIG. 17 is displayed on the touch panel unit 401 when the box image preview function and the image editing function are enabled.

FIG. 18 is a flow chart illustrating an exemplary flow of control processing executed by the printing system 1000 according to the present exemplary embodiment. More specifically, FIG. 18 illustrates exemplary processing that implements the box image preview function and the image editing function. Each of steps S1901 through S1905 is implemented by the control unit 205 by loading and executing, on the RAM 208, a control program stored on the ROM 207 and the HDD 209. The processing illustrated in FIG. 18 is started when the control unit 205 recognizes that the user has pressed the "preview and edit image" button illustrated in FIG. 6A.

Referring to FIG. 18, in step S1901, the control unit 205 accesses a box document stored on the HDD 209 and acquires the RIP-processed image and the finishing information stored thereon from the received job ticket. In step S1902, the control unit 205 executes control for displaying the region to be cut off by the trimming on the preview screen displayed on the touch panel unit 401 according to information about the RIP-processed image and the information about the trimming width included in the finishing information. To paraphrase this, in step S1902, the control unit 205 executes control for displaying a preview screen 901 illustrated in FIG. 17.

In step S1903, the control unit 205 receives a user designation input by operating a button via the preview screen 901 displayed on the touch panel unit 401. The processing in step S1903 will be described in detail below with reference to FIG. 17. In step S1904, the control unit 205 determines whether the image preview mode is to be completed. To paraphrase this, in step S1904, if the control unit 205 recognizes that the user has pressed a "return" button 9001 via the preview screen 901 (YES in step S1904), then the control unit 205 determines that the user has input an instruction for ending the image preview mode and advances to processing in step S1905.

In step S1905, the control unit 205 stores the RIP-processed image information again in the same box of the HDD 209 as the box storing the processing target document data. Then the processing ends. In ending the processing illustrated in FIG. 18, the control unit 205 returns the screen displayed on the touch panel unit 401 to the screen illustrated in FIG. 6A.

In the following description about the example illustrated in FIG. 17, the content displayed on the preview screen 901 will be described in detail. In addition, exemplary processing executed by the control unit 205 according to the display control program previously stored on the ROM 207 of the printing apparatus 100 when the user presses a button displayed on the touch panel unit 401 will be described in detail.

Referring to FIG. 17, the preview screen 901 is the preview screen displayed in step S1902 (FIG. 18). An image displayed in the center of the preview screen 901 is the RIP-processed image information acquired from the box-stored document stored on the HDD 209.

In the present exemplary embodiment, the region to be cut off from the sheet output and printed by the sheet processing apparatus 200 by the trimming, which is identified as a result of analysis of the received job, corresponds to an image editing permitted region. On the other hand, the printed region that remains as the output sheet after the trimming corresponds to a hatching region 9020. The hatching region 9020 will be described in detail below.

The control unit 205 executes addition processing for adding different editing attributes to the region to be cut off by the trimming and the printing region not to be cut off from the output sheet according to the following processing method. Furthermore, the control unit 205 executes control for displaying an editing screen that includes a first region (an image editing permitted region) and a second region (an image editing inhibited region), which are to be displayed on the operation unit (the touch panel unit 401) according to each of the added editing attributes.

In the preview screen 901 illustrated in FIG. 17, hatching display information, which is displayed overlapping on the RIP-processed image information above, below, and to the right of the RIP-processed image information displayed on the preview screen 901 corresponds to the region whose value of the sixth bit of the object attribute information is "0". The region assigned with the value "0" is the image editing permitted region.

To paraphrase this, the hatching display information denotes the region to be cut off by the trimming by the inline finisher. The cutter 1207 of the inline finisher trims the sheet along alternate long and short dashed lines provided at the boundary between a hatching region and a non-hatching region.

On the preview screen 901, the top, the bottom, and the right portions of the sheet are displayed as the regions to be cut off by the trimming. In other words, the page corresponding to the image displayed on the preview screen 901 is to be postprocessed (bound) in a state whose left edge becomes the spine and the right edge thereof becomes an open edge of the resulting product. The position (width) of the region to be cut off by the trimming is determined according to the position of the spine of the resulting bound product (i.e., whether the a left- (or right-)open product or a top-open product the resulting product is), the number of the trimming lines (i.e., whether three-side trimming or one-side trimming the sheet bundle is to be trimmed by), and whether the currently displayed page is a page printed on the front surface of the sheet printed by two-sided printing.

The image editing processing executed by the control unit 205 by using the touch panel unit 401 will be described in detail below. In the right portion of the preview screen 901, buttons that can be operated by the user are provided.

When the user presses a "display by magnification" button 9002, the display shifts to a magnified preview mode, although not illustrated in the drawing. When the user presses an "edit outside-register-mark region" button 9003, the control unit 205 executes control for shifting the display screen to an outside-register-mark image editing screen 902.

When the user presses a "print" button 9004, the control unit 205 executes control for shifting the display screen to the screen illustrated in FIG. 6B. When the user presses the "return" button 9001, the control unit 205 executes control for shifting the display screen to the screen illustrated in FIG. 6A.

Via the outside-register-mark image editing screen 902, the user can arbitrarily edit the image information about the region to be cut off by the trimming by the inline finisher (i.e., the image information corresponding to the hatching region illustrated in FIG. 17). Image information 9010, which is displayed in the center of the outside-register-mark image editing screen 902, corresponds to the RIP-processed image information acquired from the box-stored document stored on the HDD 209.

In the outside-register-mark image editing screen 902 illustrated in FIG. 17, hatching regions 9020, which are displayed overlapping on the RIP-processed image information 9011 in the center of the display (i.e., not above, below, or to the right of the RIP-processed image information 9010) corresponds to the region whose value of the sixth bit of the object attribute information is "1". In other words, the hatching display denotes the region not to be cut off by the trimming by the inline finisher. The region indicated by the hatching display is a region including the image whose editing by the user is inhibited.

In the right portion of the outside-register-mark image editing screen 902, buttons that can be operated by the user are provided. The button from the upper-right button 9021, which indicates an icon, corresponds to a tool used for editing the image. By using the tool, such as a free thin line drawing tool, a region designation tool, a deletion tool, a region painting tool, a color selection tool, a display magnification tool, a character addition tool, a free thick line drawing tool, a linear line drawing tool, and a Bezier curve drawing tool, the user can edit the image.

The free thin line drawing tool is a tool used for adding a thin line to the image data according to a user operation. The region designation tool is a tool used for designating a region to be trimmed and a region to be copied of the image data according to a user operation. The deletion tool is a tool used for deleting a region of the image data designated by the user. The region painting tool is a tool used for painting a region designated by the user with a specific color. As described above, the user can edit the image by using the above-described tool.

However, the region that can be image-edited is a region 9030 only, which is not displayed by hatching. The control unit 205 manages the region displayed by hatching so that the user cannot execute image editing on the hatching region. It is also useful if the control unit 205 notifies the user that the region cannot be image-edited if the user has instructed editing on the region whose editing is inhibited.

When the user presses an "overlay" button 9022, the control unit 205 executes control for shifting the display to an overlay editing screen 903 illustrated in FIG. 17. On the other hand, when the user presses a "change register mark" button 9023, the control unit 205 executes control for shifting the display to an image protection mark changing screen 904 illustrated in FIG. 17.

When the user presses an "apply result of editing to all pages" button 9024, the control unit 205 executes control for applying the instruction input by the user by executing the image editing by using the above-described image editing tools for the page to RIP-processed image information of the other pages of the same document as they are. This is useful if the color bars and the register marks existing on the same coordinate for all the pages are to be deleted in a lump and if the same text string is to be added to all the pages. However, in applying the same result of the editing to all the pages, the editing result is not to be applied to each pixel of the RIP-processed image of each page whose sixth bit of the object attribute has the value "1". When the user presses a "return to preview" button 9025, the control unit 205 executes control for shifting the display to the preview screen 901.

Via the overlay editing screen 903, the user can generate an overlay image for the RIP-processed image information. The generated overlay image information is not related to the sixth bit of the pixel of the RIP-processed image that indicates the object attribute. Accordingly, the user can freely generate an image to be overlaid for each page.

The control unit 205 temporarily associates the image information to be overlaid with the RIP-processed image information for each page and temporarily stores the image information to be overlaid that is linked with the RIP-processed image information for each page on the HDD 209. Furthermore, the control unit 205 executes control for displaying a window 9040 in the upper-right portion of the overlay editing screen 903. The window 9040 displays a reduced image of the temporarily stored overlay image.

By pressing a portion of the screen corresponding to the reduced image of an arbitrary page, the user can freely generate overlay image information within the region of the RIP-processed image. More specifically, in this case, a button similar to the button 9021 displayed on the outside-register-mark image editing screen 902, which indicates an icon, is displayed. Accordingly, the user can generate overlay image information by the operation similar to the operation executed via the outside-register-mark image editing screen 902. The image information to be overlaid includes a text that denotes a page number or a serial number.

When the user presses an "apply result of editing to all page" button 9041, the control unit 205 executes control for applying the editing operation on the overlay image information, which has been executed for the page by the user by using the image editing tool, to an overlay image of the other pages of the same document.

When the user presses a "return to editing of outside-register-mark region" button 9042, the control unit 205 executes control for shifting the display to the outside-register-mark-image editing screen 902. At the same time, the control unit 205 executes processing for overlaying and combining the overlay image information, which has been temporarily stored on the HDD 209, on and with the RIP-processed image information for each page to be linked therewith. However, the overlaying and combination processing is not executed to each pixel of the RIP-processed image for each page whose sixth bit that indicates the object attribute has the value "1".

Via the image protection mark changing screen 904, the user can change the value of the sixth bit of the RIP-processed image information that indicates the object attribute. This is useful if a pixel region 9050, which is a region to remain after the trimming by the inline finisher, is to be exceptionally subjected to image editing.

In the image protection mark changing screen 904, the pixel region 9050, whose sixth bit of the RIP-processed image information that indicates the object attribute has the value "1", is displayed as a hatching region. The control unit 205 displays arrow icon buttons 9051 through 9054, which can be operated by the user to change the regions, above, below, and to the right and the left of the hatching display.

By dragging any one of the arrow icon buttons 9051 through 9054, the user can change or modify (magnify or reduce) the hatching region. At the same time as the hatching region is changed, the control unit 205 updates the value of the sixth bit of the RIP-processed image information that indicates the object attribute.

The image protection mark changing screen 904 also includes trimming lines 9061 through 9063 used in trimming (cutting) by the cutter 1207 of the inline finisher, which is illustrated by alternate long and short dashed lines. The display by the alternate long and short dashed lines is not changed by the above-described user operation. Accordingly, the user is allowed to readily verify, via the image protection mark changing screen 904, the difference between the original image editing inhibited region and an image editing inhibited area that is set after the change of the areas by the user operation.

When the user presses an "apply result of editing to all pages" button 9071, the control unit 205 applies the value of the sixth bit of the RIP-processed image information that indicates the object attribute changed by the user to all the pages. However, different content is applied to the front and the back surfaces if two-sided printing is executed.

If it has been designated by the user to bind the sheet bundle to generate a left- (or right-)open booklet, object attribute values reversed in the direction of the width of the sheet are applied to the front surface and the back surface of the sheet. On the other hand, if it has been designated by the user to bind the sheet bundle to generate a top-open booklet, object attribute values mutually reverse in the direction of the length of the sheet are applied to the front surface and the back surface of the sheet.

When the user presses a "return to editing of outside-register-mark region" button 9072, the control unit 205 executes control for shifting the display to the outside-register-mark-image editing screen 902.

With the above-described configuration, the printing system 1000 according to the present exemplary embodiment has the following effects in executing the processing via the preview screen.

In the method discussed in Japanese Patent Application Laid-Open No. 2008-30331, images included in a region to be cut off by trimming by an inline finisher are automatically deleted from RIP-processed image information except those included in a region (a bleed). On the other hand, according to the present exemplary embodiment having the above-described configuration, the user can freely and selectively delete or add an image from and to image information included in the region to be cut off by the trimming. Accordingly, the present exemplary embodiment can increase the user convenience.

As characteristic to the present exemplary embodiment, an attribute that restricts (inhibits) image editing by the user is added to the object attribute information about the RIP-processed image information. Accordingly, the present exemplary embodiment having the above-described configuration, when the user desires to edit the RIP-processed image, can prevent editing by the user of an image included in a region to remain in a bound postprocessed product, which is different from the region to be cut off by the trimming, by an operation mistake.

Now, a second exemplary embodiment of the present invention will be described in detail below. In the present exemplary embodiment, a method that allows the user to visually verify a trimming size tolerance if an inevitably occurring size tolerance has arisen on the trimmer (cutter unit) of the inline finisher will be described below with reference to FIGS. 19A and 19B.

Figure 19A:
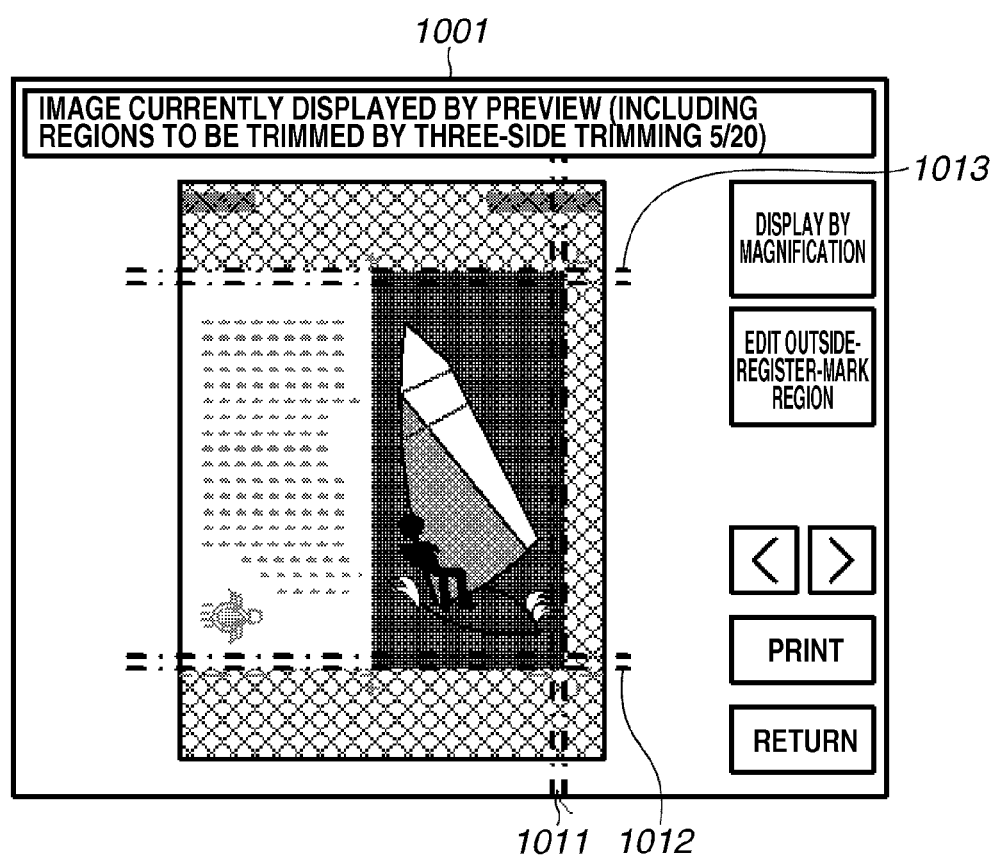
FIGS. 19A and 19B illustrate examples of a UI displayed on the touch panel unit.
Figure 19B:
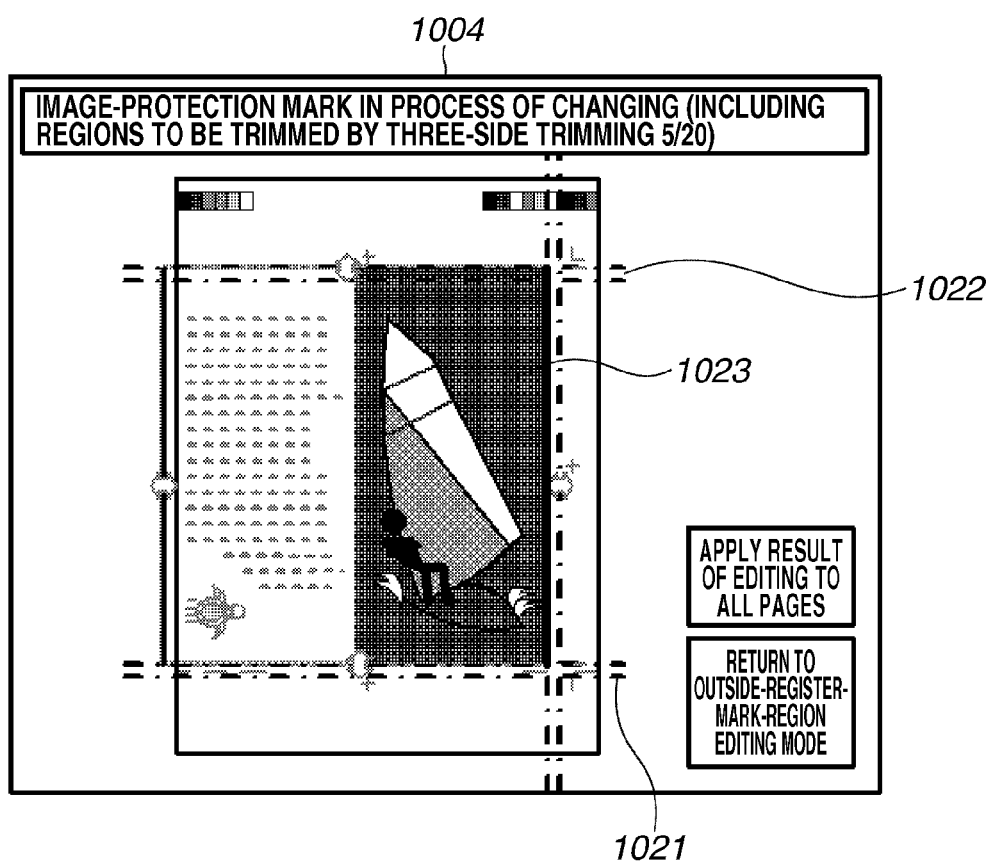

FIGS. 19A and 19B illustrate examples of a UI displayed on the touch panel unit 401 illustrated in FIG. 4. The UI illustrated in each of FIGS. 19A and 19B notifies the user of the trimming size tolerance.

Referring to FIG. 19A, a preview screen 1001 is similar to the preview screen 901 illustrated in FIG. 17 except that each of trimming lines used in trimming the sheet by using the cutter 1207 of the inline finisher, which is displayed by alternate long and short dashed lines in the first exemplary embodiment described above, is displayed by double (parallel) lines 1011 through 1013 in the present embodiment.

The trimming size tolerance that may arise in the trimming by using the trimmer of the inline finisher is previously recorded on the ROM 207 of the control unit 205 as a numerical value. More specifically, the trimming size tolerance is information about a maximum difference (mm) from the trimming width designated by the user, which is used as the reference value, in the positive or negative sine directions. Furthermore, the numerical value is defined as the specification of the product (the gluing binding machine 200b) at the stage of designing and manufacturing the gluing binding machine 200b.

According to the trimming size tolerance, on the preview screen 1001, an outermost position and an innermost position, at which the sheet can be actually trimmed, are displayed by alternate long and short dashed lines.

Sixth bit of the RIP-processed image information that indicates the object attribute is set according to the outermost line of the trimming size tolerance as its reference. This is because the region of the supplementary region 1603 equivalent to the region to include the bleed is aligned at the outermost position of the trimming size tolerance on the RIP-processed image information. With the above-described configuration, the present exemplary embodiment can effectively prevent image editing by the user on the region to possibly remain after the trimming by the inline finisher.

Similarly, in FIG. 19B, a screen 1004 is equivalent to the image protection mark changing screen 904 illustrated in FIG. 17. On the screen 1004, each of trimming lines used in trimming the sheet by using the cutter 1207 of the inline finisher, which is displayed by alternate long and short dashed lines in the first exemplary embodiment described above, is displayed by double (parallel) lines 1021 through 1023.

If the user desires to edit the image information within the trimming size tolerance, the user can use the function via the image protection mark changing screen 1004 to change the pixel whose sixth value that indicates the object attribute has the value "1".

In each exemplary embodiment described above, the image data received as PDL document data is subjected to binding processing. However, the present invention is not limited to this. More specifically, the present invention can be implemented by executing binding processing on image data acquired by reading by using the scanner unit 201 and stored on the HDD 209.

In addition, the present invention can be implemented if, in displaying a preview image on the external apparatus (PC) 103, the processing illustrated in FIGS. 16A and 16B and 18 is executed and the screens illustrated in FIGS. 17 and 19.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-290251 filed Dec. 22, 2009, which is hereby incorporated by reference herein in its entirety.

What is claimed is:

1. A printing apparatus for printing an image on a sheet based on image data and conveying the sheet on which the image is printed to a post-processing apparatus configured to cut trim the printed sheet, the printing apparatus comprising:
   a display unit configured to display the image data;
   an editing unit configured to edit the image data displayed by the display unit;

an obtaining unit configured to obtain information about a cut position at which the post-processing apparatus cuts the sheet; and a control unit configured to permit editing by the editing unit of a first region, which is a region to be cut off by the post-processing apparatus according to the information obtained by the obtaining unit and configured to restrict editing by the editing unit of a second region not to be cut off by the post-processing apparatus according to the information obtained by the obtaining unit.

2. The printing apparatus according to claim 1, wherein the control unit is configured to control the display unit to display for displaying information indicating the first region and information indicating the second region on the image data displayed by the display unit so that a user can discriminate the first region from the second region.

3. The printing apparatus according to claim 1, wherein the control unit is configured to control the display unit to display an image indicating the first region and an image indicating the second region overlapping with the image data displayed by the display unit.

4. The printing apparatus according to claim 1, further comprising a notification unit configured to notify a user, if the user instructs editing by the editing unit of the first region, that editing of the first region is restricted.

5. The printing apparatus according to claim 1, wherein the control unit is configured to add an image editing restriction attribute to a pixel included in the second region.

6. A control method for controlling a printing apparatus for printing an image on a sheet based on image data and conveying the sheet on which the image is printed to a post-processing apparatus configured to cut the sheet, the control method comprising:

displaying the image data;

editing the displayed image data;

obtaining information about a cut position at which the post-processing apparatus cuts the sheet; and executing control for permitting editing of a first region, which is a region to be cut off by the post-processing apparatus according to the obtained information and for restricting editing of a second region not to be cut off by the post-processing apparatus according to the obtained information.

7. A non-transitory computer-readable storage medium storing a computer program for controlling a printing apparatus for printing an image on a sheet based on image data and conveying a sheet on which the image is printed to a post-processing apparatus configured to cut the sheet, which, when executed by a computer, cause the computer to perform operations comprising:

displaying the image data;

editing the displayed image data;

obtaining information about a cut position at which the post-processing apparatus cuts the sheet; and executing control for permitting editing of a first region, which is a region to be cut off by the post-processing apparatus according to the obtained information and for restricting editing of a second region not to be cut off by the post-processing apparatus according to the obtained information.

* * * * *